United States Patent [19]
Endo et al.

[11] Patent Number: 5,585,719
[45] Date of Patent: Dec. 17, 1996

[54] MAGNETORESISTANCE EFFECT ELEMENT SENSOR AND AN ELECTRONIC CIRCUIT THEREFOR

[75] Inventors: Michiko Endo; Nobuyoshi Shimizu; Shigemi Kurashima; Hiroshi Kajitani; Shigeo Tanji; Mieko Kawamoto, all of Kawasaki, Japan

[73] Assignee: Fujitsu Limited, Kawasaki, Japan

[21] Appl. No.: 205,378

[22] Filed: Mar. 4, 1994

[30] Foreign Application Priority Data

Mar. 11, 1993 [JP] Japan ................................. 5-049747
Apr. 20, 1993 [JP] Japan ................................. 5-091712
Feb. 23, 1994 [JP] Japan ................................. 6-024579

[51] Int. Cl.$^6$ .......................... G01P 3/488; G01D 5/16; G01D 5/244; G01N 27/72
[52] U.S. Cl. .................. 324/235; 324/174; 324/207.12; 324/207.21; 327/510
[58] Field of Search ..................... 324/173, 174, 324/207.12, 207.21, 207.24, 207.25, 235, 251, 252, 207.2; 235/449; 338/32 R; 327/510

[56] References Cited

U.S. PATENT DOCUMENTS

| | | | |
|---|---|---|---|
| 4,361,805 | 11/1982 | Narimatsu et al. | 324/207.21 |
| 4,506,217 | 3/1985 | Rothley et al. | 324/252 X |
| 4,712,064 | 12/1987 | Eckardt et al. | 324/207.21 |
| 4,935,698 | 6/1990 | Kawaji et al. | 324/235 X |
| 5,021,736 | 6/1991 | Gonsalves et al. | 324/207.21 X |
| 5,045,920 | 9/1991 | Vig et al. | 324/207.2 X |

FOREIGN PATENT DOCUMENTS 0419040 3/1991 European Pat. Off. .
0493260 7/1992 European Pat. Off. .

OTHER PUBLICATIONS

Kwiatkowski et al., "The permalloy magnetoresistive sensors–properties and applications," *J. Phys. E.: Sci. Instrum.*, vol. 19, 1986, pp. 503–515.
*ELEKTOR*, vol. 1, 1988, "Magnetoresistive Sensoren," pp. 22–24.
Petersen, A., "Drehzahlmessung mit magnetoresistiven Sensormodulen," *ELEKTRONIK*, vol. 2, 1991, pp. 78–81.
Hager, G., "Magnetoresistive Sensoren messen Drehwinkel," *ELEKTRONIK*, vol. 12, 1993, pp. 30–34.

*Primary Examiner*—Gerard R. Strecker
*Attorney, Agent, or Firm*—Staas & Halsey

[57] ABSTRACT

A magnetic sensor including a magnetoresistance effect element directed to prevent deterioration in the detection sensitivity occurring due to inversion of the magnetization of a plurality of ferromagnetic thin film stripes forming the magnetoresistance effect element with respect to the initial direction during the repeated operations, the magnetic sensor being arranged in such a manner that the magnetoresistance effect element is disposed at a position deviating from the center of the magnetic pole surface of a cylindrical magnet, preferably at a position deviating in a direction perpendicular to a direction in which the magnetic object to be detected is moved. The thus-employed arrangement enables a bias magnetic field to be applied to the magnetoresistance effect element in parallel to the deviation direction. Therefore, the magnetization of all of the plurality of the ferromagnetic thin film stripes forming the magnetoresistance effect element can be caused to face the same direction. As a result, the detection sensitivity can be stabilized because inversion of the magnetization can be prevented even if external magnetic fields are repeatedly applied.

16 Claims, 20 Drawing Sheets

FIG. 13
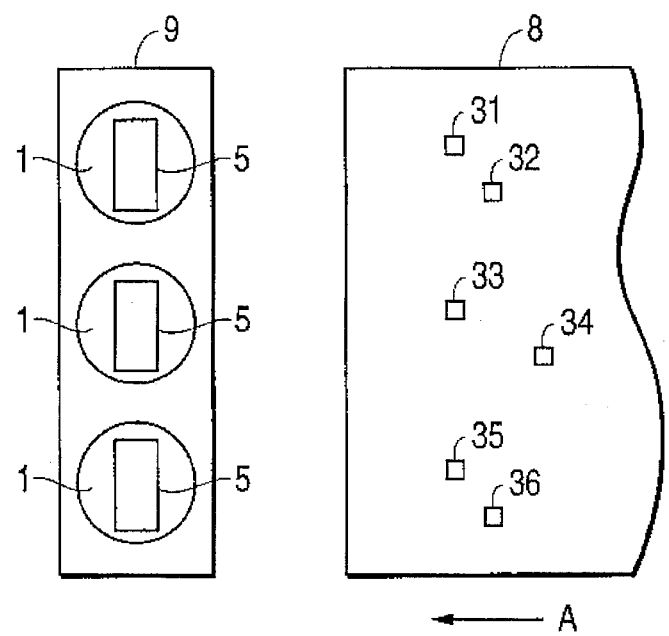
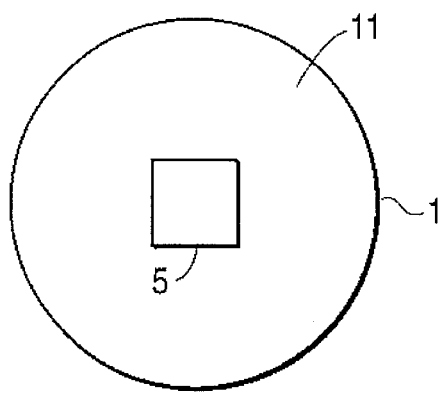
FIG. 14A
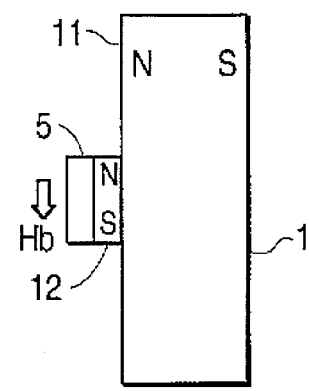
FIG. 14B
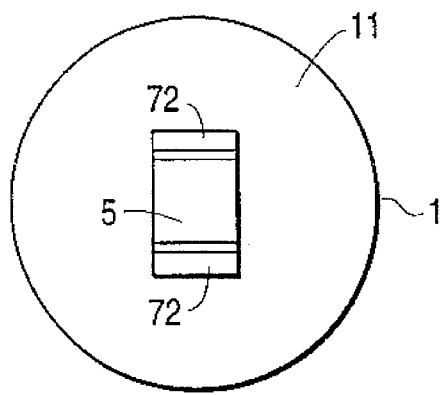
FIG. 14C
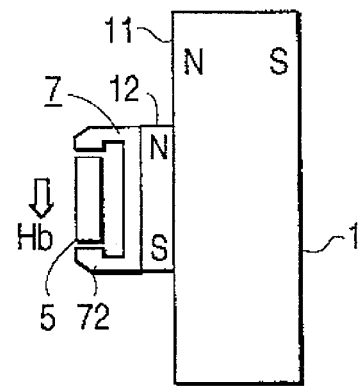
FIG. 14D

FIG. 17
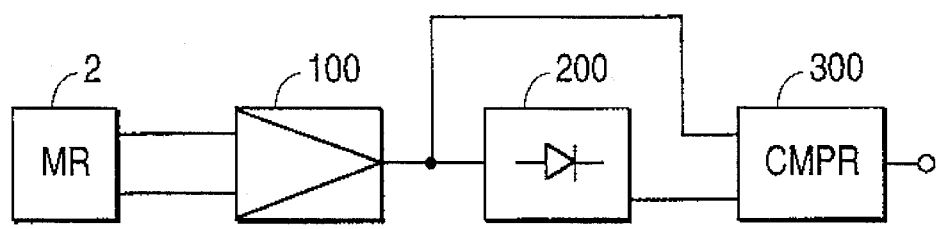
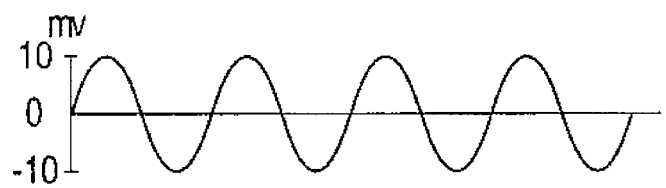
FIG. 18A
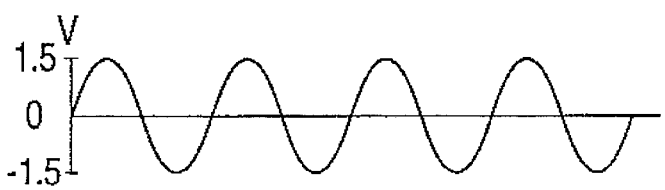
FIG. 18B
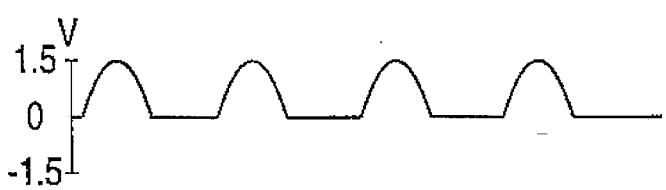
FIG. 18C
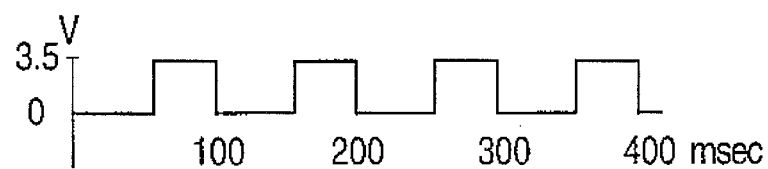
FIG. 18D

MAGNETORESISTANCE EFFECT ELEMENT SENSOR AND AN ELECTRONIC CIRCUIT THEREFOR

FIELD OF THE INVENTION

The present invention relates to a magnetic sensor for detecting a magnetic object by using a magnetoresistance effect element made of a ferromagnetic thin film, the magnetic object being one of a the category thereof comprising an object made of a soft magnetic material, a magnetic pattern formed on the surface of a non-magnetic substance and an object, such as the teeth of a gear, attached to a rotational shaft.

A sensor using a magnetoresistance effect element is capable, in a non-contact manner, of detecting a change in a magnetic field, which ranges from 1 to $10^4$ A/m, while exhibiting a simple principle and structure, resulting in that the sensor of the foregoing type has been employed in a variety of industrial fields. The magnetoresistance effect element made of a ferromagnetic metal thin film has superior temperature characteristics and higher sensitivity a low magnetic field as compared with a semiconductor magnetoresistance effect element using InSb. Further, the magnetoresistance effect element can be formed on a silicon substrate together with related semiconductor integrated circuits by using an ordinary semiconductor process. Therefore, it has been expected to serve as a sensor for factory automation equipment, automobiles or office equipment or the like that can preferably be controlled by using a microprocessor.

DESCRIPTION OF THE RELATED ART

Inventors of the present invention experimentally produced a magnetic sensor, arranged as shown in FIGS. 23A to 23D, in order to obtain high sensitivity in the vicinity of a zero magnetic field (i.e., a magnetic field of close to zero Oe). FIG. 23A is a plan view, and FIG. 23B is a cross-sectional view taken along line 23B—23B of FIG. 23A. FIGS. 23C and 23D are cross sectional views taken along line 23C/D—23C/D of FIG. 23A. As illustrated above, a magnetoresistance effect element 2 is disposed at substantially the center of a flat surface which forms a magnetic pole of a cylindrical permanent magnet 1. FIGS. 23C and 23D are schematic views which illustrate the change in the magnetic field, applied to the magnetoresistance effect element 2, when an object 3 made of a magnetic substance is moved in a direction designated by an arrow A parallel to a magnetic pole surface 11 of the permanent magnet 1. The arrow-headed dashed lines indicate the lines of magnetic force.

In a case where the object 3 is positioned away (i.e., displaced remotely) from the magnetoresistance effect element 2, the magnetoresistance effect element 2 is subjected only to magnetic fields perpendicular to the surface thereof as in FIG. 23B. When the magnetic object 3, as shown in FIG. 23C, approaches the magnetoresistance effect element 2, magnetic field components (hereinafter called "sensitive magnetic fields Hs) are applied to the magnetoresistance effect element 2. In a state where the object 3 has moved nearest to and then starts departing from the magnetoresistance effect element 2 as shown in FIG. 23D, the magnetoresistance effect element 2 is subjected to inverse directional magnetic field components –Hs.

FIG. 24A is a perspective view which illustrates the overall structure, FIG. 24B is an enlarged plan view, and FIG. 24C is a partial, further enlarged plan view of the structure of the magnetoresistance effect element 2.

The magnetoresistance effect element 2, made of ferromagnetic thin film stripes 4 disposed in parallel to each other and connected in series in their longitudinal direction, is formed on a substrate 5 made of a non-magnetic substance, the surface of which has at least an insulating characteristic. The ferromagnetic thin film stripes 4 are made of, for example, an alloy of iron and nickel (FeNi). As can be understood from the figures, the ferromagnetic thin film stripes 4 form a closed circuit comprising electrodes 15, 16, 17 and 18 located at four positions that divide the closed circuit into four equal sections. Therefore, the ferromagnetic thin film stripes 4 and the electrodes 15, 16, 17 and 18 form a bridge circuit.

The magnetoresistance effect element 2 arranged as discussed above is of a so-called barber pole type. As shown in FIGS. 24B and 24C, a multiplicity of conductive thin film stripes 6 extending in a direction, which makes an angle of about 45° from the longitudinal direction of the ferromagnetic thin film stripes 4, are formed on the ferromagnetic thin film stripes 4. Therefore, electric current i flowing through each ferromagnetic thin film stripe 4 makes an angle of 45° from the longitudinal direction of the ferromagnetic thin film stripes 4. In a portion in which the conductive thin film stripes 6 are formed, a major portion of the electric currents flow through the conductive thin film stripes 6.

The usual ferromagnetic thin film stripe has, as is well known, magnetization M in the longitudinal direction thereof. Therefore, in the barber-pole-type ferromagnetic thin film stripes 4 shown in FIG. 24C, the electric current i and the magnetization M make an angle of 45° if no external magnetic field is applied to the same. If the foregoing sensitive magnetic field Hs is applied to the ferromagnetic thin film stripes 4 shown in FIG. 24C, the magnetization M is rotated in the plane of the ferromagnetic thin film stripes 4.

As is known, the resistance of the ferromagnetic thin film stripe becomes maximum when the electric current i and the magnetization M run parallel to each other, while the same becomes minimum when the electric current i and the magnetization M are made perpendicular to each other. Therefore, the rotation of the magnetization M, so as to approach the direction of the electric current i, caused by applying the sensitive magnetic field Hs, will increase the resistance of the magnetoresistance effect element 2. On the other hand, the rotation of the magnetization M to approach the direction perpendicular to the electric current i will reduce the resistance of the magnetoresistance effect element 2.

The resistance change rate ($\Delta p/po$) of the barber-pole-type ferromagnetic thin film stripes 4 and the applied magnetic field Hs hold the relation as shown in FIG. 25, where po is the resistance when the magnetic field Hs is not applied. As illustrated above, an excellent linearity is exhibited in a region in which a weak magnetic field is applied. Therefore, a satisfactory detection sensitivity can be obtained when a small change in the weak magnetic field takes place.

As can be understood from FIG. 24C, if the direction of the magnetization M changes by an angular amount of 180° in the ferromagnetic thin film stripes 4, the tendency of the resistance change ratio occurring due to the application of the sensitive magnetic field Hs becomes inverse. That is, a change of 180° from an initial direction of the magnetization M causes a corresponding difference to occur in the resistance change rate ($\Delta p/po$), as shown in FIG. 25, between that designated by a continuous line curve and that designated by a dashed line curve. Another fact can be understood that the difference in the inclination of the conductive thin film stripes 6, by an angular degree of 90° from the longitudinal direction of the ferromagnetic thin film stripes 4, causes a similar difference to occur.

In the magnetoresistance effect element 2 shown in FIG. 24B, the directions in which the conductive thin film stripes 6, of any two adjacent sides of the bridge circuit, extend, make an angular separation of 90°. Therefore, if the sensitive magnetic field Hs or −Hs is applied to the overall body of the magnetoresistance effect element 2, the tendency of the change in the resistance occurring in the ferromagnetic thin film stripes 4 on the adjacent sides becomes different. That is, when the resistance of the ferromagnetic thin film stripes 4 on one side increases, the resistance of the ferromagnetic thin film stripes 4 on another side is reduced. As a result, the change in the sensitive magnetic field Hs causes the output signals from, for example, the electrodes 16 and 18 disposed on a diagonal line of the bridge circuit, to be changed similarly to that designated by the curve denoting the resistance change rate ($\Delta p/po$) shown in FIG. 25. Therefore, a change in a weak magnetic field can be detected with excellent sensitivity.

The summary is as follows: the simple configuration of the permanent magnet 1 and the magnetoresistance effect element 2, as shown in FIGS. 23A–23D, enables a sensitive magnetic sensor having the characteristics as shown in FIG. 25 to be obtained.

SUMMARY OF THE INVENTION

However, the foregoing magnetic sensor suffers from unstable characteristics and, more particularly, from gradual deterioration in the sensitivity over an extended time.

The inventors of the present invention investigated the cause of the foregoing problem, concluding that it resulted from a fact that the direction of the magnetization M of the ferromagnetic thin film stripes 4, disposed to run parallel to each other, is inverted due to the repeated application of the sensitive magnetic field Hs. That is, an assumption is made that the approach of the magnetic object 3 strengthens the sensitive magnetic field Hs to be applied and therefore the magnetization M is caused to be directed substantially perpendicularly to the longitudinal direction of the ferromagnetic thin film stripes 4. When the magnetic object 3 has been moved away and the sensitive magnetic field Hs has become substantially zero, the magnetization M is sometimes caused to face in the opposite direction relatively to the initial direction. The foregoing inversion of the magnetization M does not always take place similarly in each of the ferromagnetic thin film stripes 4.

If the magnetization M is directed inversely (i.e., changed in direction by 180°), as described above, the tendency of the increase/decrease in the resistance of the ferromagnetic thin film stripes 4 occurring due to the application of the sensitive magnetic field Hs is inverted. Therefore, the occurrence of the inversion of the magnetization in a portion of the plurality of the ferromagnetic thin film stripes 4 forming one side of the bridge circuit causes cancellation to take place in the ferromagnetic thin film stripes 4 between the increase and the reduction of the resistance due to the application of the sensitive magnetic field Hs or −Hs. As a result, there arises a reduction in the overall effective change in the resistance of the foregoing ferromagnetic thin film stripes 4 connected in series. That is, the sensitivity deteriorates.

In a general way, the magnetoresistance effect element 2 has temporarily applied thereto a magnetic field for the purpose of making the magnetization M, of all ferromagnetic thin film stripes 4 forming each side of the bridge circuit, face in the same direction in an initial state. If the sensitive magnetic field Hs or −Hs is repeatedly applied, the ferromagnetic thin film stripes 4 encountering (i.e., undergoing) the foregoing inversion are increased. As a result, the sensitivity deterioration becomes remarkable.

On the other hand, there has been a desire to improve a conversion circuit for processing an analog signal transmitted from the magnetic sensor comprising the magnetoresistance effect element using the foregoing ferromagnetic thin film.

FIG. 26 is a block diagram which illustrates a conventional conversion circuit, and FIG. 27A to 27D are graphs of the waveforms of signals shown in order to explain the operation of the conversion circuit. Referring to FIGS. 26 and 27A to 27D, an approximately 10 mVpp analog signal (see FIG. 27A) transmitted from the magnetoresistance effect element 2 (MR) composed of a bridge circuit of the foregoing type is amplified by a factor of about 150 times by a differential amplifier comprising two operational amplifiers M1 and M2 (see FIG. 26). The amplified signal is then integrated by an integrating circuit comprising a resistor R5 and a capacitor C1. A signal (see FIG. 27C) transmitted from the integrating circuit and the output signal from the differential amplifier are compared in a comparator M4 so that a two-state signal shown in FIG. 27D is obtained. Symbol M3 shown in FIG. 26 represents a buffer circuit inserted in order to provide impedance matching.

By using the output signal from the integrating circuit as described above, the comparison can be performed by using the central level of the original signal, that is, the DC level of the same. Therefore, even if the output signal has encountered a drift due to, for example, the temperature characteristics of the magnetoresistance effect element 2, the two-state signal corresponding to the original analog signal can be obtained.

The circuit shown in FIG. 26 comprises an integrating circuit that has a time constant determined to be about 100 msec. Therefore, the following phenomena arise. (1) A delay of the waveform shown in FIG. 27C, occurring in a period from a moment the power is supplied to a moment a constant value is realized, narrows the initial width of the binary signal pulse by $\Delta t1$ as shown in FIG. 27D. (2) Since the capacitor C1 forming the integrating circuit has a relatively large capacity of about 0.1 µF, there arises a problem in that the conversion circuit cannot easily be formed into a monolithic circuit.

The foregoing problems (1) and (2) arise due to the fact that the integrating circuit has a large time constant. However, if the time constant is determined to be a smaller value, the AC components of the original signal appear excessively in the waveform shown in FIG. 27C, and therefore the signal output from the integrating circuit having a smaller time constant cannot, of course, be employed as the reference signal for use in the foregoing comparison.

In order to overcome the foregoing problems experienced with the conventional magnetic sensor and the conversion circuit to be combined with the conventional magnetic sensor, a first object of the present invention is to provide a means capable of improving the stability of the detection sensitivity of a magnetic sensor comprising a magnetoresistance effect element made of a ferromagnetic thin film.

Another object of the present invention is to provide a means capable of preventing a change in the width of a pulse signal occurring when an analog output signal from the sensor is converted into a two-state signal.

Another object of the present invention is to provide a means capable of integrating the sensor and the conversion circuit to be combined with the sensor.

The foregoing objects can be achieved by either of a magnetic sensor, according to the present invention, for detecting an object made of a soft magnetic substance, the magnetic sensor comprising: a magnet having a surface, as a magnetic pole, disposed so as to face the object; and a magnetoresistance effect element comprising a plurality of stripes made of ferromagnetic thin films, extending in parallel to the magnetic pole surface while arranged apart from the same and connected in series at their ends, wherein the magnetoresistance effect element is disposed so as to deviate from the center of the magnetic pole surface in a direction along the magnetic pole surface, or a signal conversion circuit according to the present invention for converting an analog signal transmitted from the magnetic sensor into a two-state signal, the signal conversion circuit amplifying the analog signal, half-wave-rectifying the amplified signal, and subjecting the amplified signal and the half-wave-rectified signal to a comparison so as to obtain a two-state signal.

BRIEF DESCRIPTION OF THE DRAWINGS

FIG. 13 is a schematic plan view which illustrates another embodiment of the magnetic sensor capable of detecting a plurality of magnetic objects;

FIGS. 14A–14D illustrate another method of applying a bias magnetic field to a magnetoresistance effect element;

FIG. 17 is a block diagram which illustrates the principle structure of a signal conversion circuit according to the present invention;

FIGS. 18A–18D illustrate signal waveforms in order for explaining the operation of the signal conversion circuit according to the present invention;

DESCRIPTION OF THE PREFERRED EMBODIMENTS

FIG. 1 is an explanatory view of the principle of a magnetic sensor according to the present invention. FIG. 1A is a plan view, FIG. 1B is a cross sectional view taken along line 1B—1B of FIG. 1A, and FIGS. 1C and 1D are cross sectional views each of which is taken along line 1C/D—1C/D of FIG. 1A.

Figure 1A:
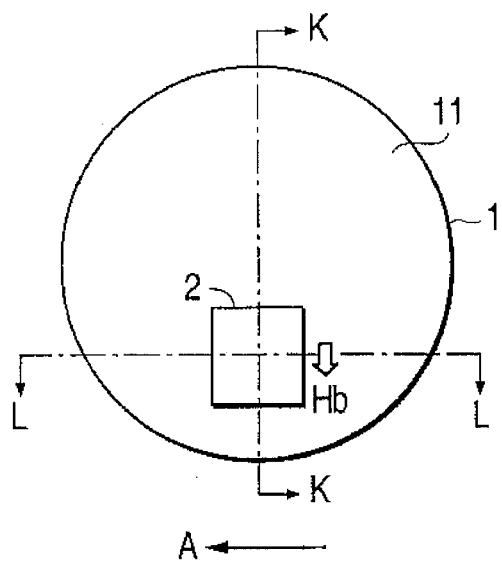
FIGS. 1A–1D illustrate the principle of a magnetic sensor according to the present invention.
Figure 1B:
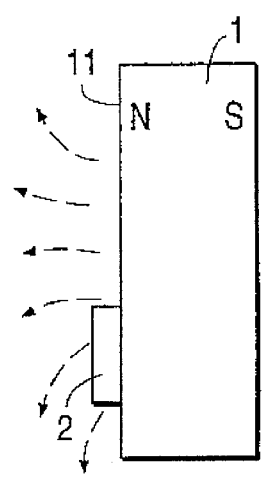
Figure 1C:
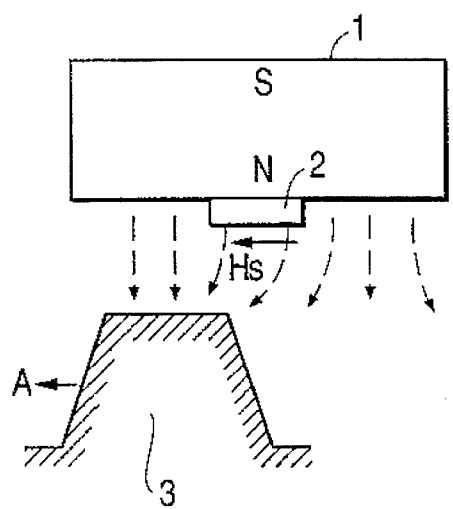
Figure 1D:
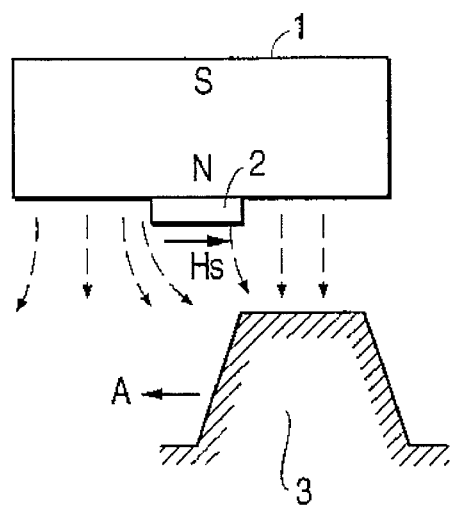

As shown in FIG. 1A, a magnetoresistance effect element 2 is located at a position deviating (i.e., displaced) from the center of a magnetic pole surface 11 of a permanent magnet 1, preferably at a position deviating, or displaced, from the center of the magnetic pole surface 11 along the magnetic pole surface 11 in a direction perpendicular to a direction, designated by an arrow A shown in FIGS. 1C and 1D, in which an object 3 is moved.

As a result of the arrangement shown in FIG. 1A, the ferromagnetic thin film stripes 4 (not shown) are applied with a magnetic field component (hereinafter called a "bias magnetic field Hb") directed in the deviation direction of the object (i.e., element 2). In a case where the magnetoresistance effect element 2 is made of barber-pole-type ferromagnetic thin film stripes 4 formed as shown in FIG. 24B, the foregoing deviation direction coincides with the longitudinal direction of the ferromagnetic thin film stripes 4.

The foregoing arrangement forcibly causes the magnetization M of all ferromagnetic thin film stripes 4 to face the direction of the bias magnetic field Hb (FIG. 1A) in a case in which the sensitive magnetic field Hs is not applied.

Therefore, the sensitive magnetic field Hs can be detected in such a manner that the initial states of the magnetization M are made to be the same for all ferromagnetic thin film stripes 4. As a result, the deterioration in the sensitivity, experienced with the conventional sensor described with reference to FIGS. 23A to 23D and which takes place due to the inversion of the magnetization M of a portion of the ferromagnetic thin film stripes 4, can be prevented.

If the magnetoresistance effect element 2 is, as described above, disposed at a position deviating (i.e., displaced) from the center of the magnetic pole surface 11, the change in the direction of the sensitive magnetic field Hs takes place when the magnetic object 3 is moved similarly to that in the arrangement shown in FIGS. 23A to 23D. Therefore, the change in the output signal from the magnetoresistance effect element 2, occurring due to the change in the direction of the sensitive magnetic field Hs, is able to hold the relationship shown in FIG. 25, i.e., either the solid line or the dotted line, depending on the vector M being in the direction shown or being rotated 180° from the direction shown, respectively, in FIG. 24C, and accordingly excellent sensitivity can be maintained in a weak magnetic field region.

It is preferable for the magnetic sensor according to this embodiment shown in FIG. 1, that the magnetoresistance effect element 2 deviates, from the center of the magnetic pole surface 11, in a direction perpendicular to the direction in which the object 3 is moved, as described above. The foregoing fact can qualitatively be described as follows.

That is, when the magnetization M of the ferromagnetic thin film stripes 4 perpendicularly faces the sensitive magnetic field Hs, the effect of the sensitive magnetic field Hs acting on the magnetization M is made maximum. Therefore, setting of the deviation direction of the ferromagnetic thin film stripes 4 as described above causes a bias magnetic field Hb, which causes the magnetization M to face a direction perpendicular to the sensitive magnetic field Hs, to be applied. As a result, the change in the resistance of the ferromagnetic thin film stripes 4, occurring due to the application of a weak sensitive magnetic field Hs, is made a maximum. An investigation of the amount of the deviation, made by the inventors of the present invention, resolved that the optimum distance is two to four times the width of the magnetoresistance effect element.

If the magnetoresistance effect element 2 is disposed so as to deviate from the center of the magnetic pole surface 11, in a direction parallel to the direction in which the object 3 is moved, the bias magnetic field Hb and, hence, the magnetization M, always faces (i.e., is oriented in) the direction of the sensitive magnetic field Hs, and the magnetoresistance effect element 2 cannot effectively be operated. Therefore, such a direction, and directions in the vicinity thereof, should be omitted for the deviation direction.

The foregoing magnetic pole surface 11 of the magnet 1 is not limited to the foregoing circular shape. If the magnetic pole surface 11 is formed into an elliptic shape or a regular polygon, such as a regular hexagonal shape, it also can be applied to the present invention.

Figure 2A:
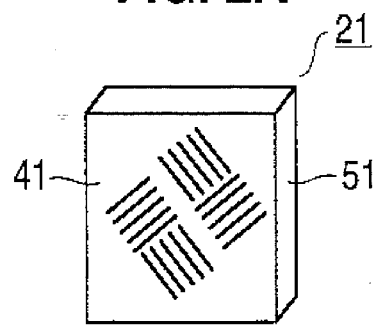
FIGS. 2A–2B illustrate an embodiment of a magnetoresistance effect element according to the present invention.
Figure 2B:
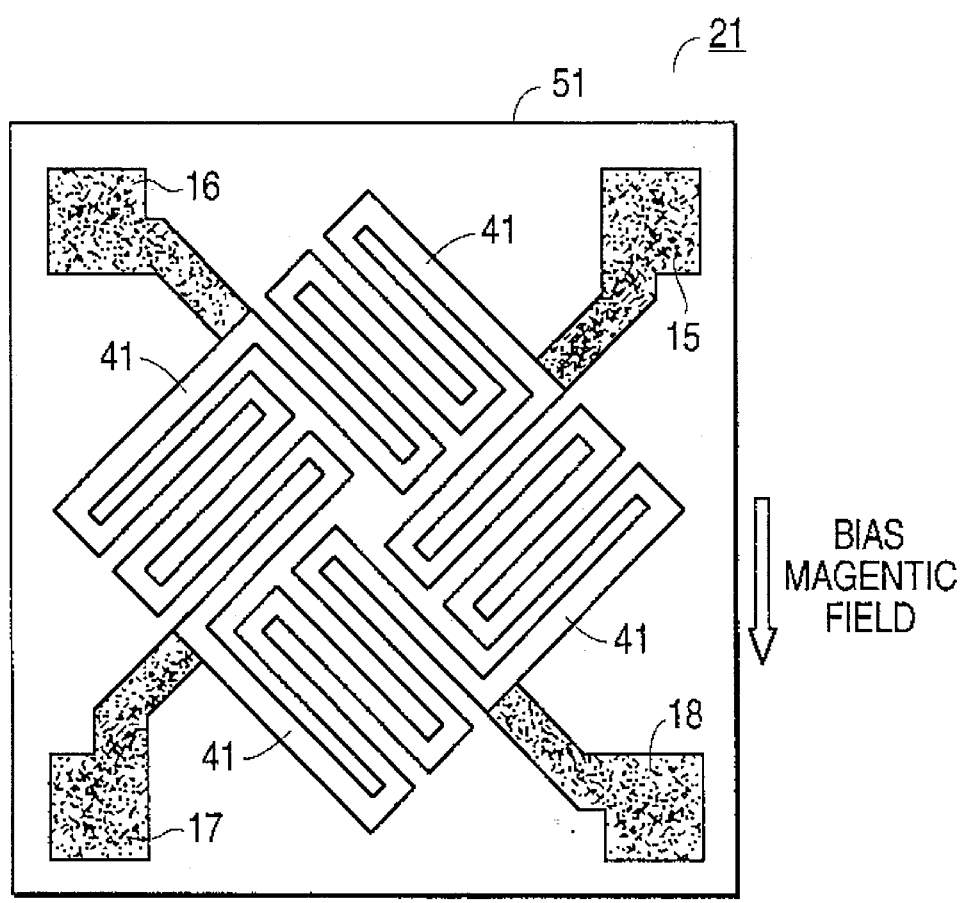

FIGS. 2A and 2B is a schematic view which illustrates the structure of a magnetoresistance effect element 21 according to the present invention, the magnetoresistance effect element 21 having similar characteristics to those of the magnetoresistance effect element 2 made of the barber-pole-type ferromagnetic thin film stripes 4 described with reference to FIGS. 24A to 24C.

In order to create the same state where the magnetization M makes an angular degree of 45° from the electric current i as in the barber-pole-type ferromagnetic thin film stripes 4, under the application of the bias magnetic field Hb, ferromagnetic thin film stripes 41 made of a NiFe alloy or a NiCo alloy, each thereof containing nickel in an amount of 80% for example, are disposed at an angle of 45° from the direction of the bias magnetic field Hb. In a case where the magnetoresistance effect element 21 is disposed to deviate from the center of the magnetic pole surface 11 in a direction perpendicular to the direction in which the object 3 is moved, the ferromagnetic thin film stripes 41 make an angle of 45° from the direction in which the object 3 is moved. Referring to FIGS. 2A and 2B, reference numeral 51 represents a substrate made of nonmagnetic material and having a surface having at least an insulating characteristic, the substrate 51 being, for example, a silicon chip covered with a $SiO_2$ film. Reference numerals 15 to 18 represent electrodes made of, for example, a gold (Au) thin film.

The magnetoresistance effect element 21 shown in FIGS. 2A and 2B exhibits an advantage, as compared with the magnetoresistance effect element 2 made of the barber-pole-type ferromagnetic thin film stripes 4 shown in FIGS. 24A to 24D, the advantage being that the process for forming the element pattern can be simplified because the conductive thin film stripes 6 are not disposed on the stripes 41.

Figure 3:
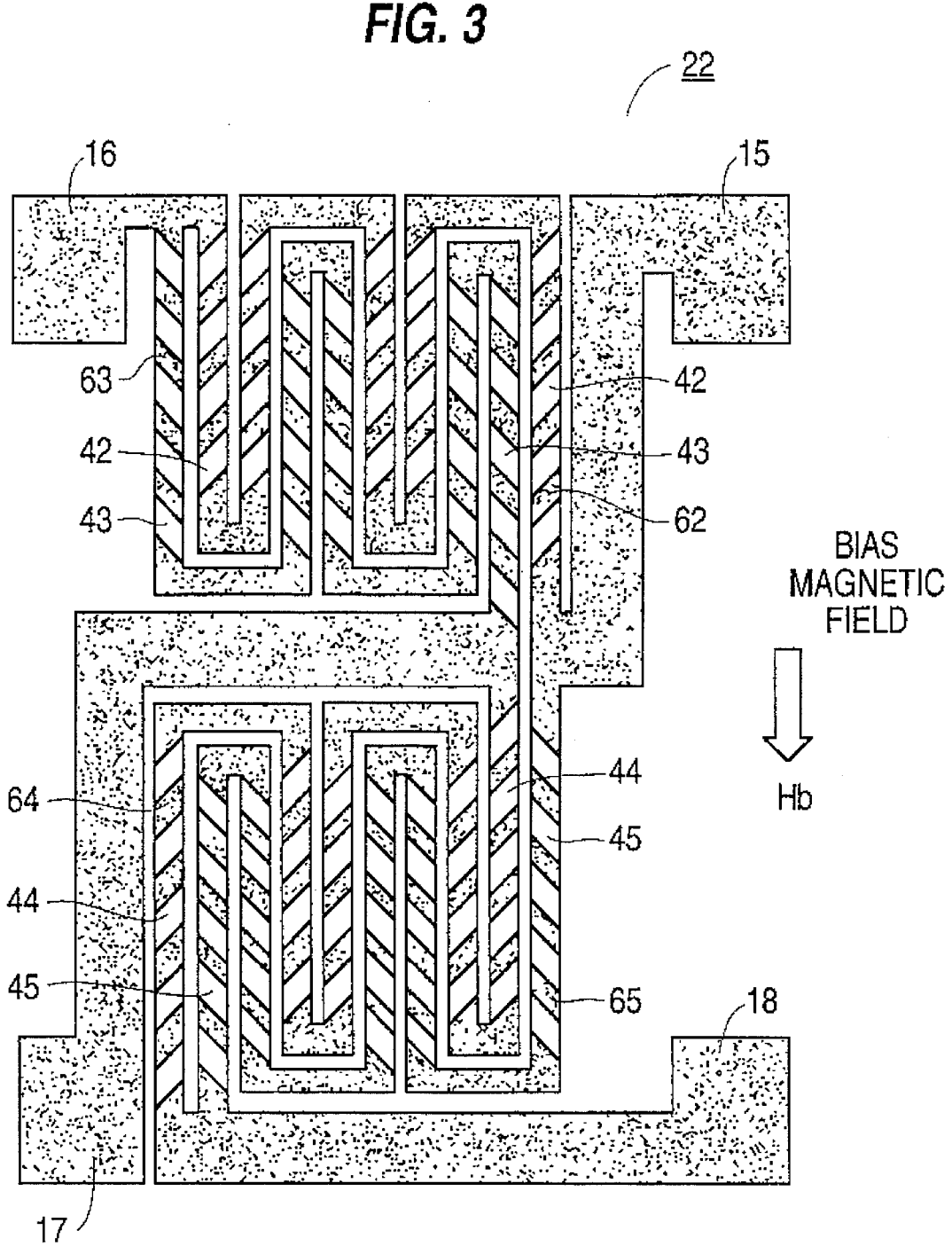
FIG. 3 is a plan view which illustrates another embodiment of a magnetoresistance effect element according to the present invention.

FIG. 3 is a schematic plan view which illustrates a magnetoresistance effect element 22 according to the present invention, the magnetoresistance effect element 22 being a modification of the magnetoresistance effect element 2 composed of the barber-pole-type ferromagnetic thin film stripes 4 shown in FIGS. 24A to 24D.

A bridge circuit comprises ferromagnetic thin film stripes 42 to 45 made of, for example, NiFe or NiCo alloys similarly to the foregoing embodiment, and electrodes 15 to 18, each of which is made of an Au thin film. Conductive thin film stripes 62 to 65, extending so as to make an angle of 45° with the longitudinal direction of the ferromagnetic thin film stripes 42 to 45, are formed on the ferromagnetic thin film stripes 42 to 45.

The ferromagnetic thin film stripes 42 and 43 run parallel to and are disposed adjacently so as to form a pair of two neighboring sides of the bridge circuit, the conductive thin film stripes 62 and 63 formed on the ferromagnetic thin film stripes 42 and 43 extending in directions of 90° from each other. Similarly, the ferromagnetic thin film stripes 44 and 45 run in parallel and are disposed adjacently so as to form another pair of two neighboring sides of the bridge circuit, the conductive thin film stripes 64 and 65 formed on the ferromagnetic thin film stripes 44 and 45 extending in directions of 90° from each other. The ferromagnetic thin film stripes 42 and 45 form a first set of two adjacent sides of the bridge circuit, while the ferromagnetic thin film stripes 43 and 44 form a second set of two other, adjacent sides of the bridge circuit. The sets of conductive thin film stripes 62, 65 and 63, 64 respectively extend in directions that make an angle of 90° from each other. Therefore, the magnetoresistance effect element 22 is equivalent to the magnetoresistance effect element 2 shown in FIGS. 24A to 24C. Also the magnetoresistance effect element 22 is disposed in such a manner that the bias magnetic field Hb can be applied in parallel with the directions in which the ferromagnetic thin film stripes 42 to 45 extend.

Figure 24A:
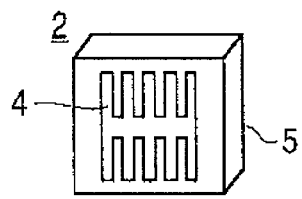
FIGS. 24A–24C illustrate the structure and the operation of a magnetoresistance effect element comprising ferromagnetic thin film stripes.
Figure 24B:
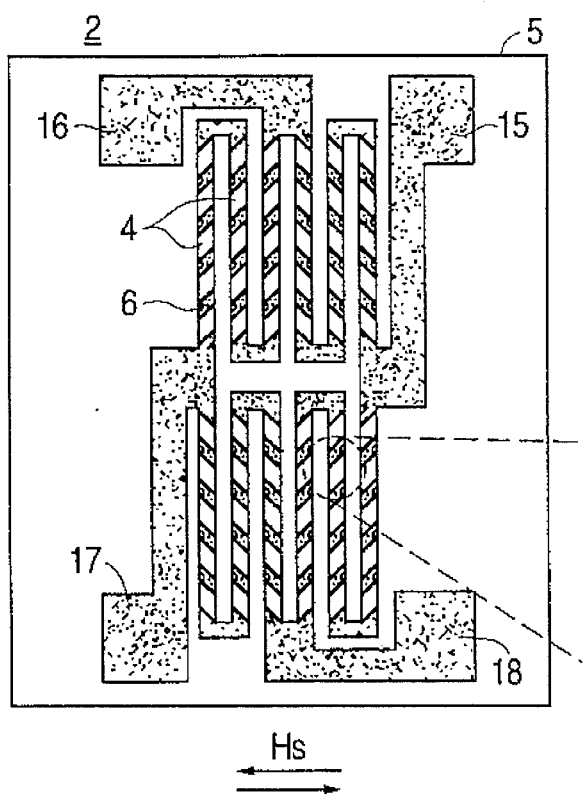
Figure 24C:
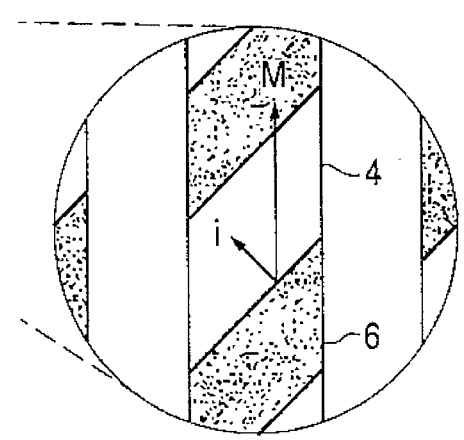
Figure 25:
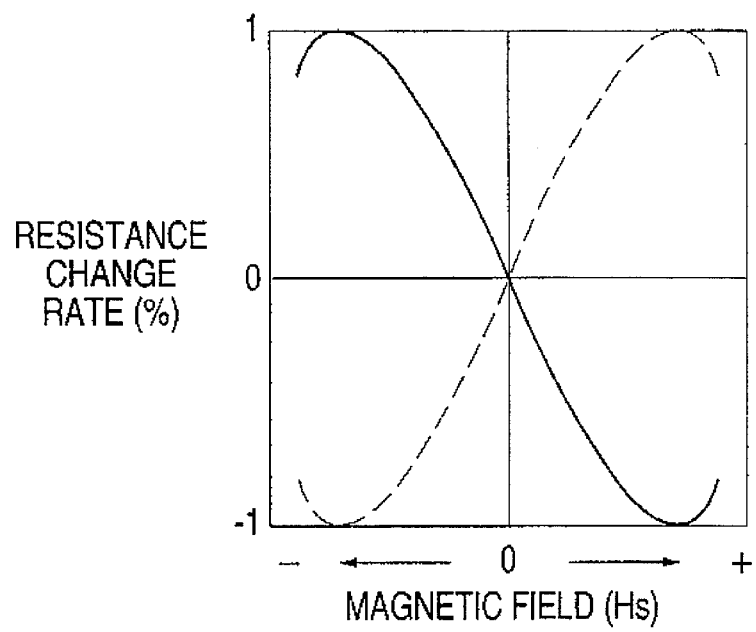
FIG. 25 is a graph which illustrates the relationship between the resistance change rate of a ferromagnetic thin film stripe and the magnetic field applied thereto.

The magnetoresistance effect element 22 shown in FIG. 3 exhibits the following advantage as compared with the magnetoresistance effect element 2 shown in FIGS. 24A to 24C. That is, since the sets of ferromagnetic thin film stripes 42, 43 and 44, 45 forming the adjacent two sides of the bridge circuit are located adjacently, an advantage can be realized in that it cannot easily be affected by an irregular distribution of the magnetic fields occurring due to a local change in the magnetic field.

Figure 4A:
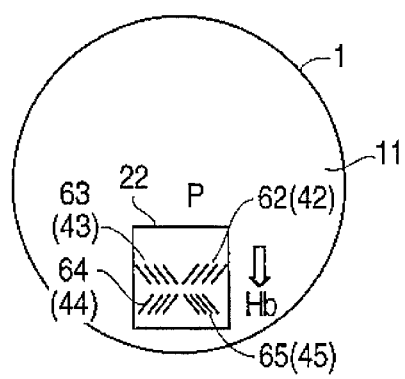
FIGS. 4A–4C include a plan view and a signal waveform view which illustrate a method according to the present invention for compensating for a change in the sensitivity with a bias magnetic field.

In the magnetic sensor shown in FIG. 1A, the strength of the bias magnetic field Hb applied to the magnetoresistance effect element varies depending upon the distance from the center of the magnetic pole surface 11 of the permanent magnet 1. FIG. 4A is a view which illustrates a method according to the present invention to compensate for the deterioration in sensitivity occurring due to the difference in the bias magnetic field Hb which takes place, depending upon the aforesaid distance. FIG. 4A is a schematic plan view, and FIGS. 4B and 4C are the waveforms of the detected signals.

The resistance change rate of a ferromagnetic thin film stripe varies depending upon the strength of the bias magnetic field Hb. Therefore, the ferromagnetic thin film stripes in the magnetoresistance effect element encounter a difference in the resistance change rate, occurring due to the difference in their positions. As a result, the detection sensitivity for the magnetic sensor deteriorates as compared with an ideal case in which equal bias magnetic fields Hb are applied to all ferromagnetic thin film stripes.

Referring to FIG. 4A, an assumption is made that the magnetoresistance effect element 22 as shown in FIG. 3 is disposed at a position deviating from center P of the magnetic pole surface 11 of the permanent magnet 1. Straight line groups 62 to 65 in FIG. 4A schematically illustrate the conductive thin film stripes disposed on the corresponding ferromagnetic thin film stripes 42 to 45 of a barber-pole-type, in order to simplify the description.

Figure 4B:
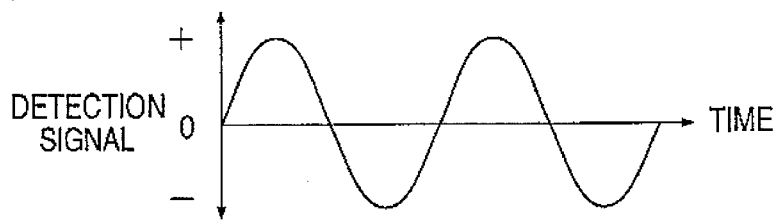
Figure 4C:
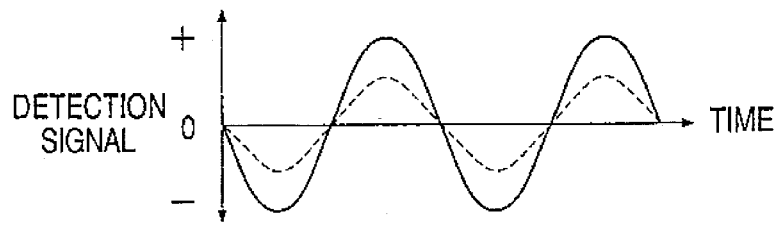

If the foregoing object 3 (FIGS. 1C and 1C) made of a magnetic substance repeatedly passes through a position adjacent to the magnetic sensor shown in FIG. 4A, the detection signal is changed as shown in FIG. 4B. FIG. 4B illustrates the waveform of a signal transmitted from the magnetoresistance effect element 22 under an ideal condition where bias magnetic fields Hb having the same strength are applied to the ferromagnetic thin film stripes 42 to 45. Actually, the ferromagnetic thin film stripes 42 and 43 positioned near the center of the magnetic pole surface 11 and the ferromagnetic thin film stripes 44 and 45 positioned relatively farther from the center of the magnetic pole surface 11 have applied thereto bias magnetic fields Hb having different strengths. Therefore, the waveform of the detection signal becomes as designated by a dashed line shown in FIG. 4C. That is, the height (or amplitude) of the detection signal is low, as illustrated.

As a result of an investigation made by the inventors of the present invention, the resistance change rate (Δp/po) of a ferromagnetic thin film stripe is lowered if its thickness is enlarged or its width is reduced. Therefore, the resistance change rates of the ferromagnetic thin film stripes 42 to 45 can be equalized, under the bias magnetic fields Hb applied, respectively by designing the thickness or the width of each of the ferromagnetic thin film stripes 42 to 45. Specifically, the thickness of each of the ferromagnetic thin film stripes 42 and 43, to which a relatively weak bias signal Hb is applied, must be thicker than that of each of the ferromagnetic thin film stripes 44 and 45 to which the relatively strong bias signal Hb is applied. As an alternative to this, the width of each of the ferromagnetic thin film stripes 42 and 43 must be narrowed with respect to that of each of the ferromagnetic thin film stripes 44 and 45. As a result, the detection signal of the magnetic sensor has a waveform, as designated by a continuous line shown in FIG. 4C, similarly to the case in which the bias magnetic fields Hb having the same intensity are applied to the ferromagnetic thin film stripes 42 to 45. That is, the height (i.e., strength or level) of the signal is increased.

Although the foregoing embodiment has been described based on the example using the magnetoresistance effect element made of barber-pole-type ferromagnetic thin film stripes, a magnetoresistance effect element made of ferromagnetic thin film stripes arranged on the basis of the idea described with reference to FIG. 2B can be applied to this embodiment.

Figure 5:
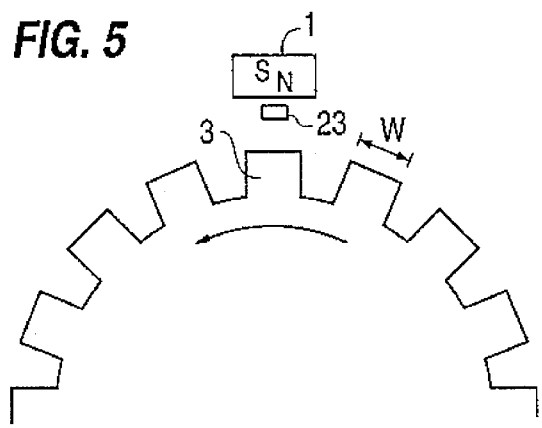
FIG. 5 is a partial elevational view which illustrates the basic concept of another embodiment of the present invention.

FIG. 5 is a schematic elevational view which illustrates a basic concept of other embodiments of the present invention.

The foregoing object 3 made of the soft magnetic substance is employed in, for example, the teeth of a gear that rotates around an axis. The foregoing magnetic sensor, made of the permanent magnet 1 and the magnetoresistance effect element 23, is disposed adjacent to the teeth of the gear. An arrangement is made in such a manner that the width W of each of the teeth is made to be substantially the same as the dimension of the magnetoresistance effect element 23 (see, e.g., FIG. 6A) and the pitch of the teeth is made to be about two to five times the width W (i.e., the width of the groove between teeth is made to be substantially the same as W or larger than W, up to about four times W).

Figure 6A:
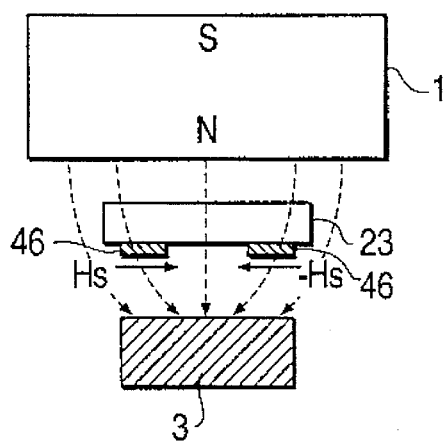
FIGS. 6A–6D are a side view and a schematic plan view which illustrate a portion relating to FIG. 5.
Figure 6B:
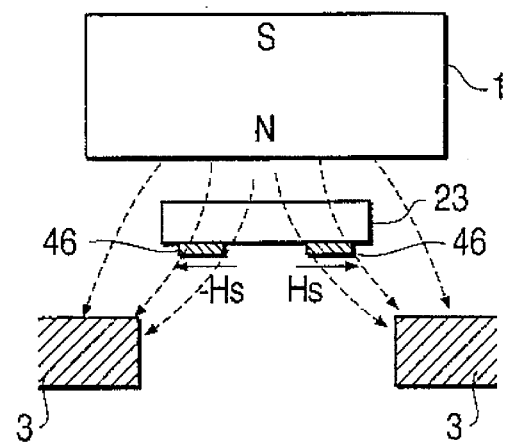
Figure 6C:
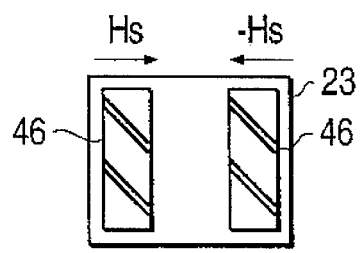
Figure 6D:
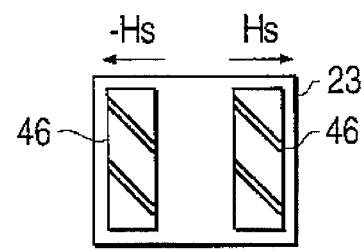

When the object 3 passes through a position adjacent to the magnetoresistance effect element 23, the sensitive magnetic field Hs as shown in FIGS. 6A to 6D is applied to the magnetoresistance effect element 23. That is, when the object 3 is positioned to face the surface of the magnetoresistance effect element 23, the magnetic flux of the permanent magnet 1 is deflected so as to be converged toward the object 3 as shown in FIG. 6A. When the object 3 is positioned apart from (i.e., displaced from) the position at which it faces the magnetoresistance effect element 23 and thus the magnetoresistance effect element 23 is positioned between adjacent objects 3, the flux of the permanent magnet 1 is deflected so as to diverge into respective portions toward the two side objects 3 as shown in FIG. 6B. As a result, sensitive magnetic fields Hs and –Hs, running in opposite directions toward each other in FIG. 6A and away from each other, in FIG. 6B are applied to the two ferromagnetic thin film stripes 46 forming the magnetoresistance effect element 23. FIGS. 6C and 6D are schematic and partial plan views respectively corresponding to FIGS. 6A and 6B. FIG. 6C and 6D illustrate barber-pole-type ferromagnetic thin film stripes 46 as an example.

Figure 7A:
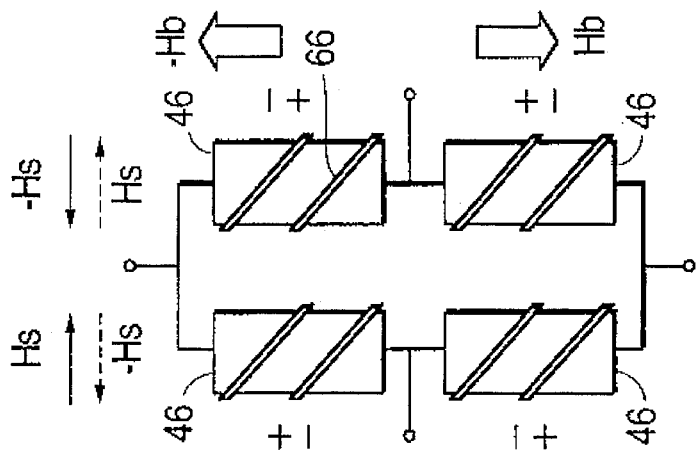
FIGS. 7A–7C illustrate the combination of the structures of a magnetoresistance effect element and a magnetic field to be applied to the magnetoresistance effect element.
Figure 7B:
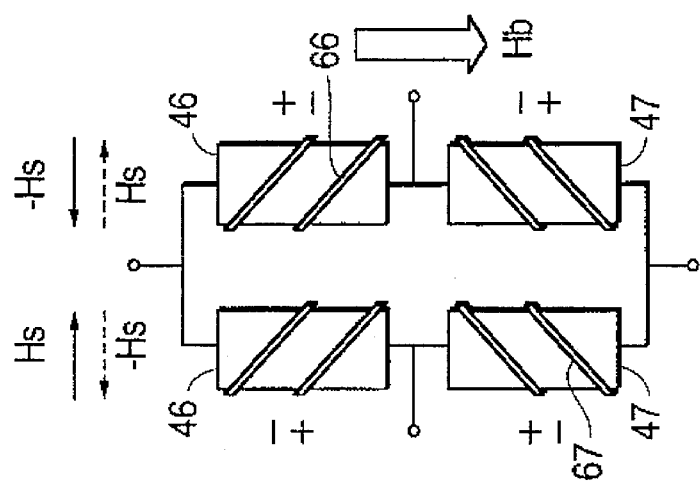
Figure 7C:
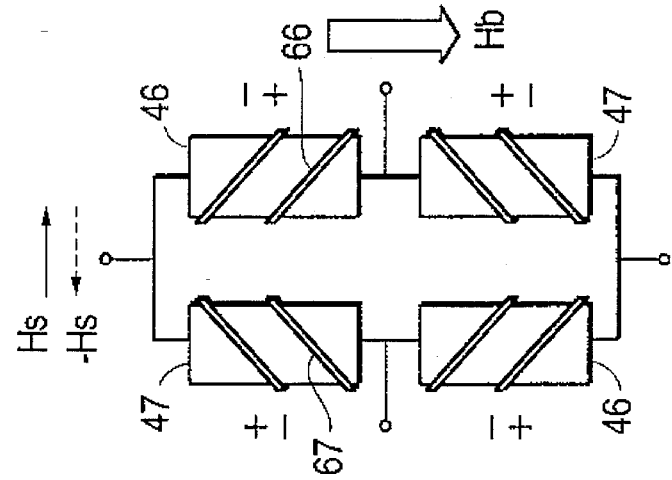

FIGS. 7A, 7B and 7C illustrate examples of combinations of the direction of the sensitive magnetic field Hs and the direction of the bias magnetic field Hb. Although FIG. 7 illustrates a magnetoresistance effect element made of the barber-pole-type ferromagnetic thin film stripes 46 and 47, it may be replaced by a magnetoresistance effect element made of ferromagnetic thin film stripes disposed to make an angular degree of 45° from the bias magnetic field Hb as shown in FIGS. 2A and 2B, for example.

FIG. 7A illustrates a case where one directional sensitive magnetic field Hs or –Hs and a bias magnetic field Hb are applied to the overall portion of the ferromagnetic thin film stripes 46 and 47. The ferromagnetic thin film stripes 46 and 47 shown in FIG. 7A have the conductive thin film stripes 66 and 67 disposed on the corresponding ferromagnetic thin film stripes 46 and 47 forming the two arbitrary adjacent sides of a bridge circuit, the conductive thin film stripes 66 and 67 making an angular degree of 90' from each other, similarly to the structure shown in FIG. 24B.

FIG. 7B illustrates a case where the sensitive magnetic fields Hs and −Hs running in opposite directions, are applied to respective ones of the two ferromagnetic thin film stripes 46 and likewise to stripes 47 disposed adjacently in a direction perpendicular to the bias magnetic field Hb, while one directional bias magnetic field Hb is applied uniformly to the ferromagnetic thin film stripes 46 and 47. The conductive thin film stripes 66 respectively disposed on the two adjacent ferromagnetic thin film stripes 46 in a direction at a 45° angle to the bias magnetic field Hb, run parallel to each other. On the other hand, the conductive thin film stripes 66, and 67, respectively disposed on the two adjacent ferromagnetic thin film stripes 46 and 47, which lie in a direction parallel to the bias magnetic field Hb, make an angle of 90° from each other.

FIG. 7C illustrates a case where the sensitive magnetic fields Hs and −Hs running in opposite directions away from each other, are applied to the two adjacent ferromagnetic thin film stripes 46 in a direction perpendicular to the bias magnetic field Hb (and −Hb) and the bias magnetic fields Hb and −Hb, running in opposite directions away from each other, are applied to the two adjacent ferromagnetic thin film stripes 46 in the direction thereof. The conductive thin film stripes 66 respectively formed on all ferromagnetic thin film stripes 46 run parallel to each other.

Corresponding to the directional change of the sensitive magnetic field between Hs and −Hs, shown in FIGS. 7A to 7C is the signs (+or−) of the resistance change which takes place in the respective ferromagnetic thin film stripes 46 and/or 47. In the illustrated combinations, the signs of the resistance changes of the two arbitrary adjacent ferromagnetic thin film stripes 46 or 47 are different from each other. Therefore, the bridge circuit composed of the foregoing ferromagnetic thin film stripes 46 and/or 47 is able to effectively operate as a magnetic sensor.

FIG. 7A corresponds to the case where the interval between the adjacent objects 3, shown in FIGS. 6A and 6B, is sufficiently long as compared with the size of the magnetoresistance effect element 23 and the overall body of the magnetoresistance effect element 23 is disposed at a position deviating in a direction from the center of the magnetic pole surface 11 of the permanent magnet 1 as shown in FIG. 1. In this embodiment, any one of the magnetoresistance effect elements 2, 21 or 22 respectively illustrated in FIGS. 24A to 24C, 2A and 2B or 3 may be employed.

FIG. 7B corresponds to a case where the width W of the foregoing teeth is almost the same as the size of the magnetoresistance effect element 23 and the pitch of the teeth is about two to five times W, as described with reference to FIGS. 6A, and the overall body of the magnetoresistance effect element 23 is disposed at a position deviating in a direction from the center of the magnetic pole surface 11 of the permanent magnet 1 as shown in FIG. 1A. Examples of the pattern of the ferromagnetic thin film stripes forming the magnetoresistance effect element according to this embodiment are shown in FIGS. 8A and 8B.

Figure 8A:
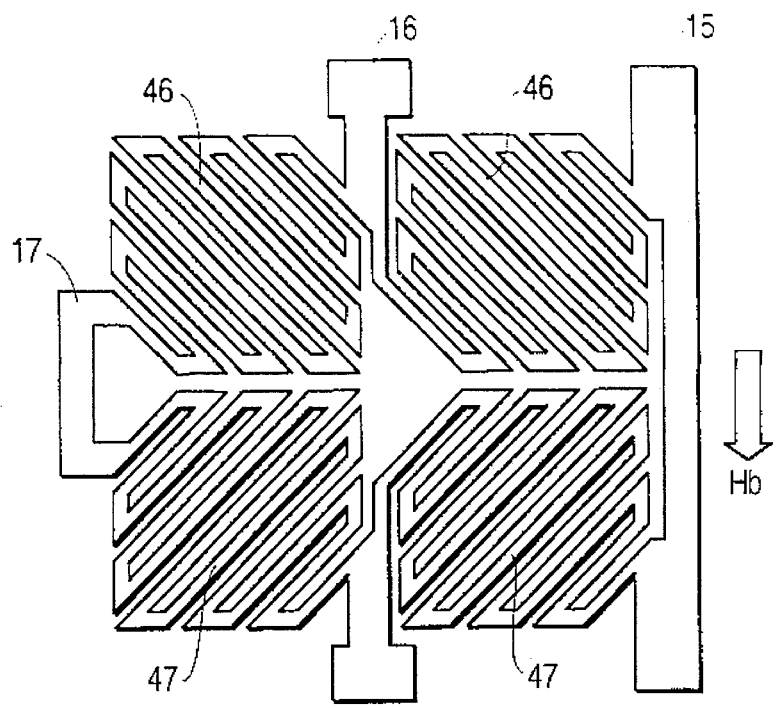
FIGS. 8A–8B illustrate the structures of a magnetoresistance effect element adaptable to the embodiment shown in FIG. 7.

A pattern shown in FIG. 8A is composed of four stripe groups, each of which comprises a plurality of ferromagnetic thin film stripes 46 and 47. All ferromagnetic thin film stripes 46 and 47 make an angle of 45° from the direction in which the bias magnetic field Hb is applied, that is the deviation direction from the magnetic pole surface 11 of the permanent magnet 1 shown in FIG. 1. The two ferromagnetic thin film stripe groups 46, disposed adjacently in a direction perpendicular to the bias magnetic field Hb, run parallel to each other. The other two ferromagnetic thin film stripe groups 47 likewise run parallel to each other. The two ferromagnetic thin film stripe groups 46 and 47, disposed adjacently in a direction running parallel to the bias magnetic field Hb, make an angle of 90° from each other. The electrodes 15 to 18 are connected to the junctions of the foregoing stripe groups.

Figure 8B:
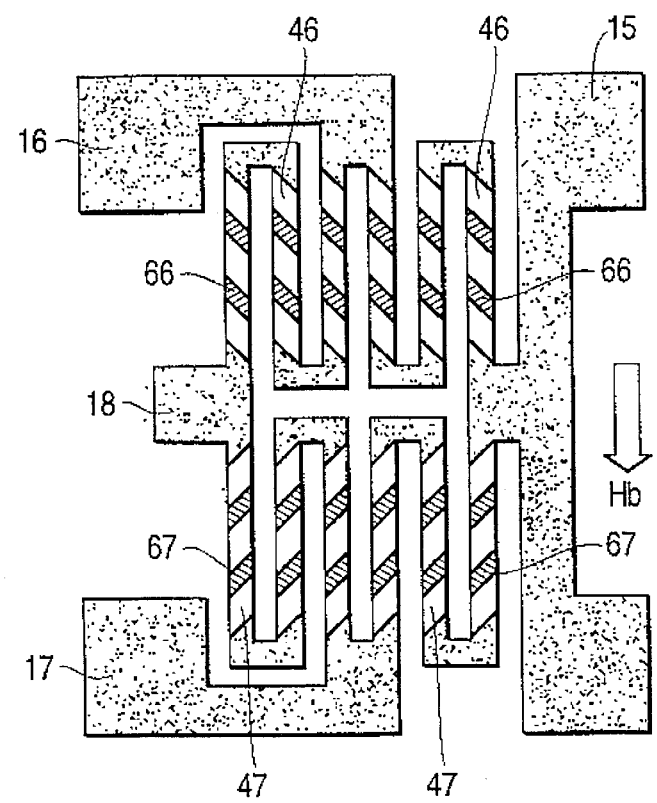

A pattern shown in FIG. 8B is composed of four stripe groups, each of which comprises a plurality of barber-pole-type ferromagnetic thin film stripes 46 and 47. All ferromagnetic thin film stripes 46 and 47 run parallel to the direction in which the bias magnetic field Hb is applied. The conductive thin film stripes 66, disposed on the two ferromagnetic thin film stripes 46 in turn disposed adjacently in a direction perpendicular to the bias magnetic field Hb, run parallel to each other. The conductive thin film stripes 67, disposed on the other two ferromagnetic thin film stripes groups 47, likewise run parallel to each other. The conductive thin film stripes 66 and 67, respectively disposed or the two ferromagnetic thin film stripe groups 46 and 47 disposed adjacently in a direction parallel to the bias magnetic field Hb, make an angle of 90° from each other. The electrodes 15 to 18 are connected to the joints of the foregoing stripe groups.

The method, described with reference to FIG. 4 and arranged to compensate for the deterioration in the sensitivity occurring due to the difference in the bias magnetic field Hb which takes place depending upon the bias distance from the center of the magnetic pole surface 11, can be applied to the pattern shown in FIG. 8A or 8B. That is, the design is made in such a manner that the thickness of the ferromagnetic thin film stripes 46, to which a relatively weak bias signal Hb is applied, is made thicker than that of the ferromagnetic thin film stripes 47, to which a relatively strong bias signal Hb is applied, or in such a manner that the width of the ferromagnetic thin film stripes 46 is made narrower than that of the ferromagnetic thin film stripes 47.

Figure 9A:
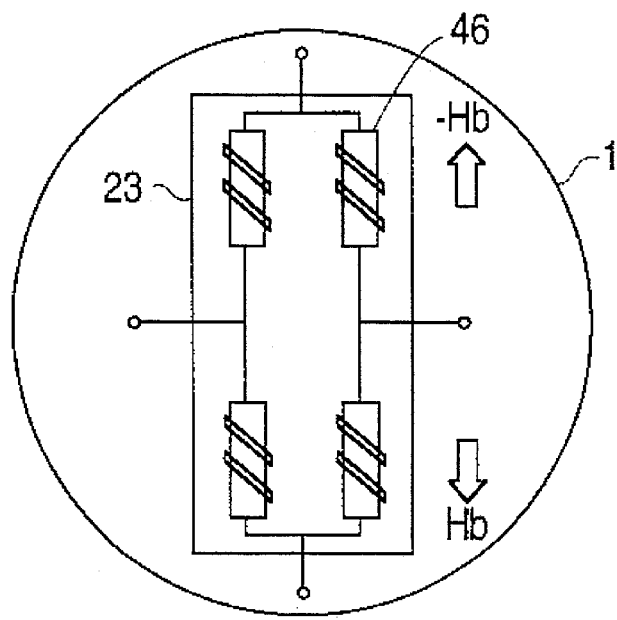
FIGS. 9A–9B illustrate another embodiment relating to FIG. 7.

Referring back to FIG. 7C, the illustrated structure corresponds to a structure described with reference to FIG. 6A, in which the width W of the foregoing teeth is almost the same as the size of the magnetoresistance effect element 23 and the pitch of the teeth is about two to five times W. Furthermore, the four ferromagnetic thin film stripes 46 forming a magnetoresistance effect element are disposed at positions deviating from the center of a magnetic pole surface while being disposed symmetrically with respect to he center of the magnetic pole surface, as shown in FIG. 9A. Thus, bias magnetic fields Hb and −Hb opposing each other are respectively applied to the ferromagnetic thin film stripes 46 deviating in the different directions.

Figure 9B:
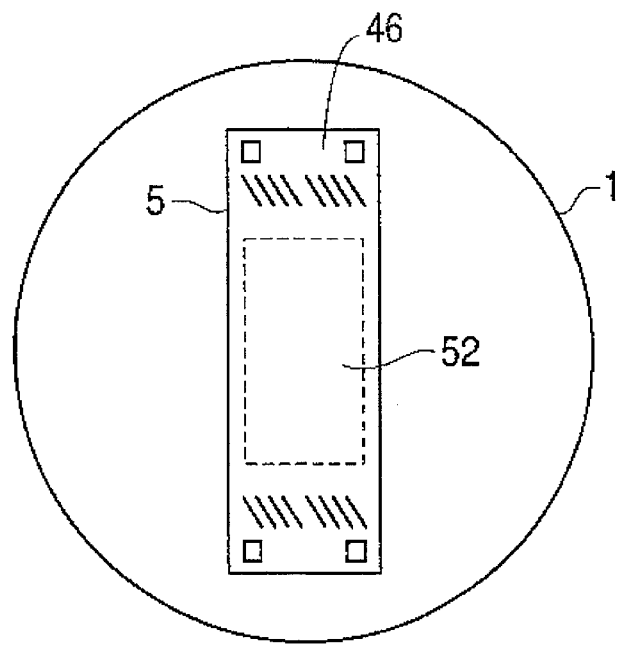

As a result of the arrangement of the ferromagnetic thin film stripes 46, an empty region can be obtained at the central portion of the substrate 5, as shown in FIG. 9B. If the substrate 5 comprises a silicon chip covered with a $SiO_2$ film, a structure can be formed in which the ferromagnetic thin film stripes 46 are disposed on the $SiO_2$ film and the central region 52 of the chip can be used as a space for forming a semiconductor integrated circuit for processing the detection signal from the magnetoresistance effect element.

Figure 10B:
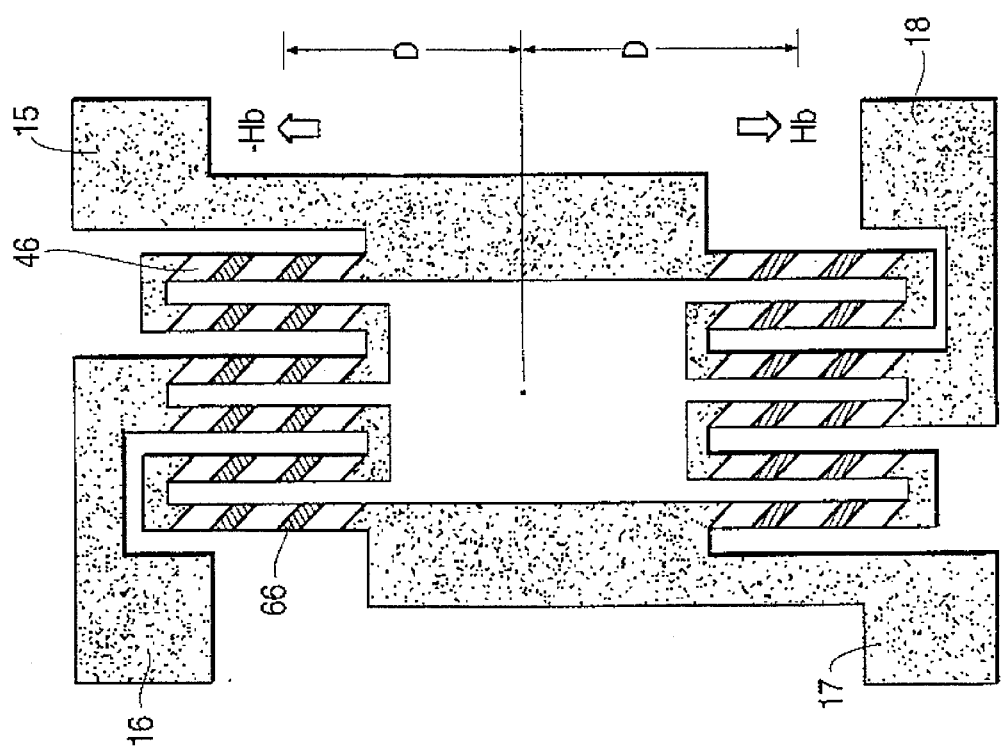
FIGS. 10A–10B illustrate the structures of a magnetoresistance effect element adaptable to the embodiment shown in FIG. 7.
Figure 10A:
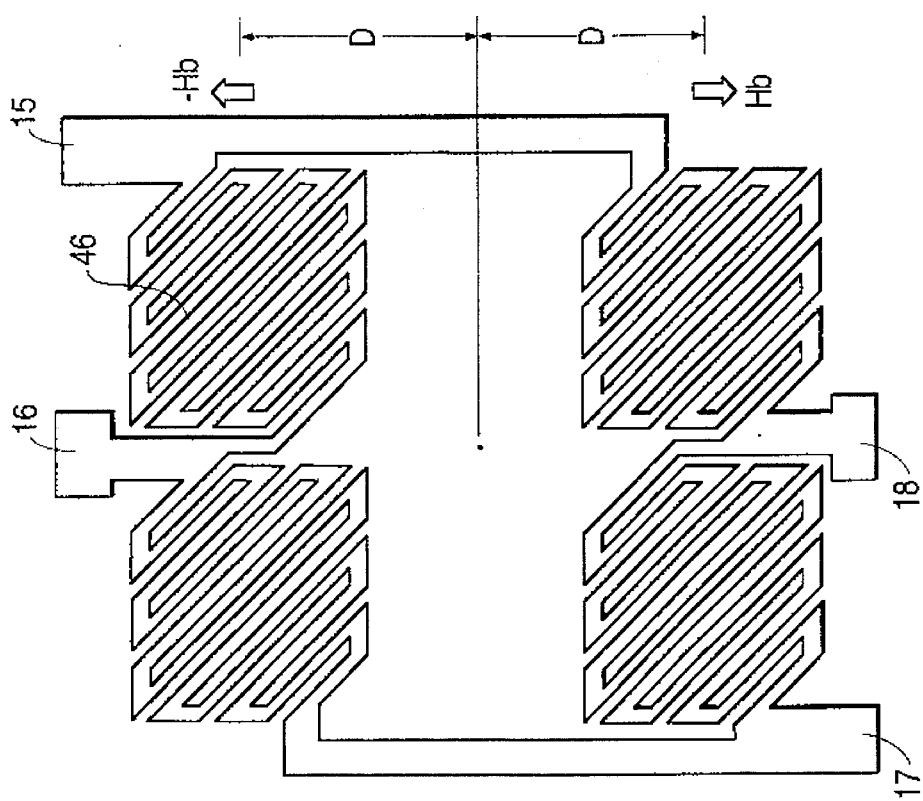

FIGS. 10A and 10B illustrate examples of the pattern of the ferromagnetic thin film stripes 46 forming the magnetoresistance effect element 23 shown in FIGS. 9A and 9B.

The pattern shown in FIG. 10A is composed of four stripe groups, each of which comprises a plurality of ferromagnetic thin film stripes 46. All ferromagnetic thin film stripes 46 make an angle of 45° from the direction in which the bias magnetic field Hb or −Hb is applied, the ferromagnetic thin film stripes 46 running parallel to each other. The foregoing stripe groups are disposed at positions deviating at the respective centers thereof from the center of the pattern by a predetermined distance D in order to be applied with the bias magnetic field Hb or −Hb having a predetermined strength. The electrodes 15 to 18 are connected to the joints of the foregoing stripe groups.

The pattern shown in FIG. 10B is composed of four stripe groups, each of which comprises a plurality of barber-pole-type ferromagnetic thin film stripes 46. All ferromagnetic thin film stripes 46 run parallel to the direction in which the bias magnetic field Hb or −Hb is applied. The conductive thin film stripes 66 disposed on the ferromagnetic thin film stripes 46 run parallel to each other while making an angle of 45° from the direction in which the bias magnetic field Hb or −Hb is applied. Similarly to the structure shown in FIG. 10A, the stripe groups are disposed at positions deviating from the center of the pattern by a predetermined distance D. The electrodes 15 to 18 are connected to the junctions of the stripe groups.

Figure 11A:
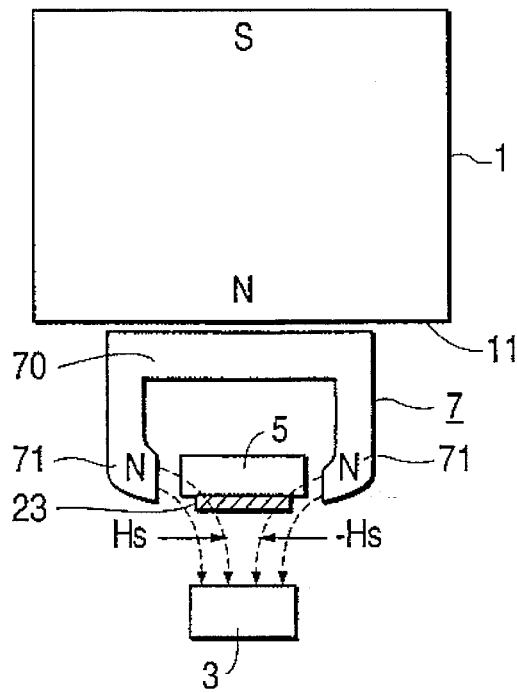
FIGS. 11A–11B illustrate another method of applying a bias magnetic field to a magnetoresistance effect element.
Figure 11B:
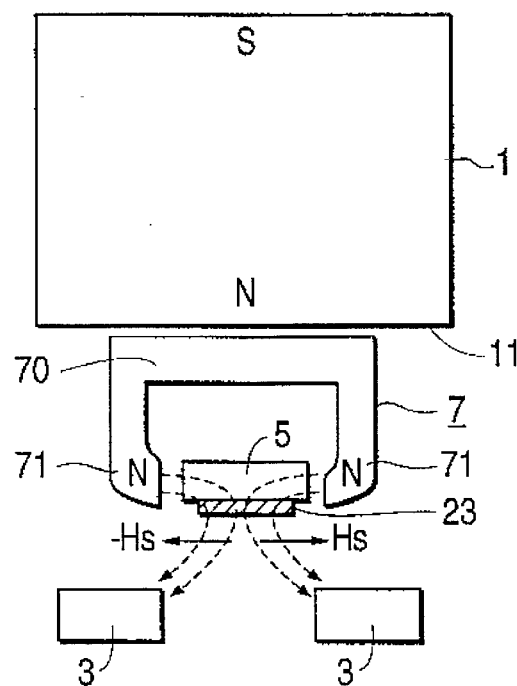

FIGS. 11A and 11B are schematic front views of a means for efficiently applying sensitive magnetic fields Hs and −Hs opposing each other to the two adjacent ferromagnetic thin film stripes 46 as shown in FIGS. 6A and 6B or FIGS. 7B and 7C or the stripe group composed of the plurality of ferromagnetic thin film stripes 46 or 47 arranged as shown in FIGS. 8A and 8B.

A magnetic yoke 7 made of a soft magnetic substance is disposed on a magnetic pole surface 11 of a cylindrical permanent magnet 1. The magnetic yoke 7 comprises a plate-like portion 70 placed substantially in contact with the magnetic pole surface 11 and extruding portions 71 formed to extend inwardly, from the two opposite sides, to hold the magnetoresistance effect element 23. Reference numeral 5 represents a substrate for supporting the magnetoresistance effect element 23. FIG. Supporting the magnetoresistance effect element 23. FIG. 11A illustrates a state where the object 3, made of a magnetic substance, is positioned to face the magnetoresistance effect element 23, while FIG. 11B illustrates a state where the magnetoresistance effect element 23 is positioned between two adjacent objects 3. Magnetic force lines ejected from the magnetic pole surface 11 run from the leading portions of the extruding portions 71 toward the object 3, as designated by dashed lines each having an arrow. Since the magnetic flux density is increased, as compared with the structure in which the magnetic yoke 7 is not employed, stronger bias magnetic fields Hb and −Hb are applied to the magnetoresistance effect element 23. As the magnetoresistance effect element 23, the ferromagnetic thin film stripes having the pattern formed as shown in FIGS. 8A and 8B or FIGS. 10A and 10B may be employed.

Figure 12A:
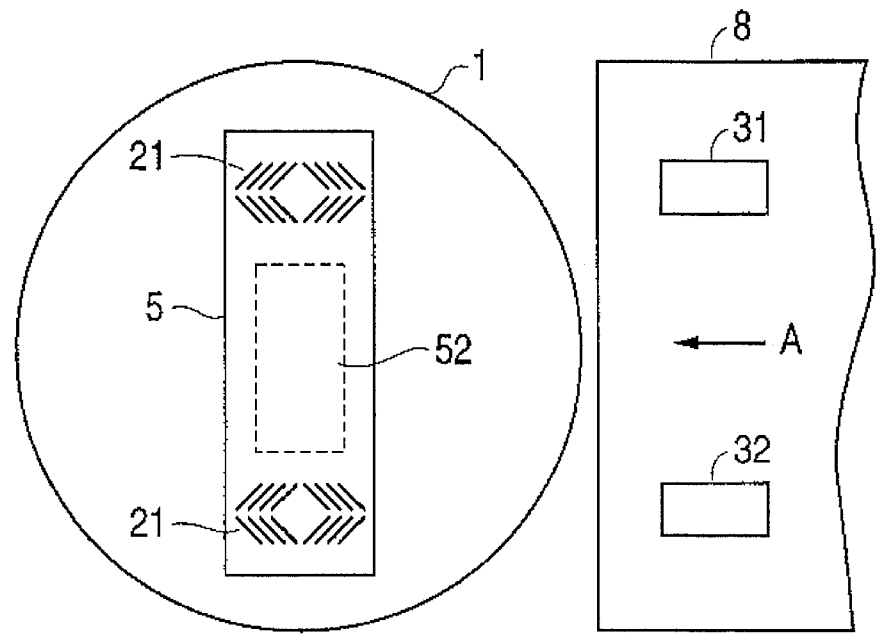
FIGS. 12A–12B illustrate an embodiment of a magnetic sensor capable of detecting a plurality of magnetic objects.
Figure 12B:
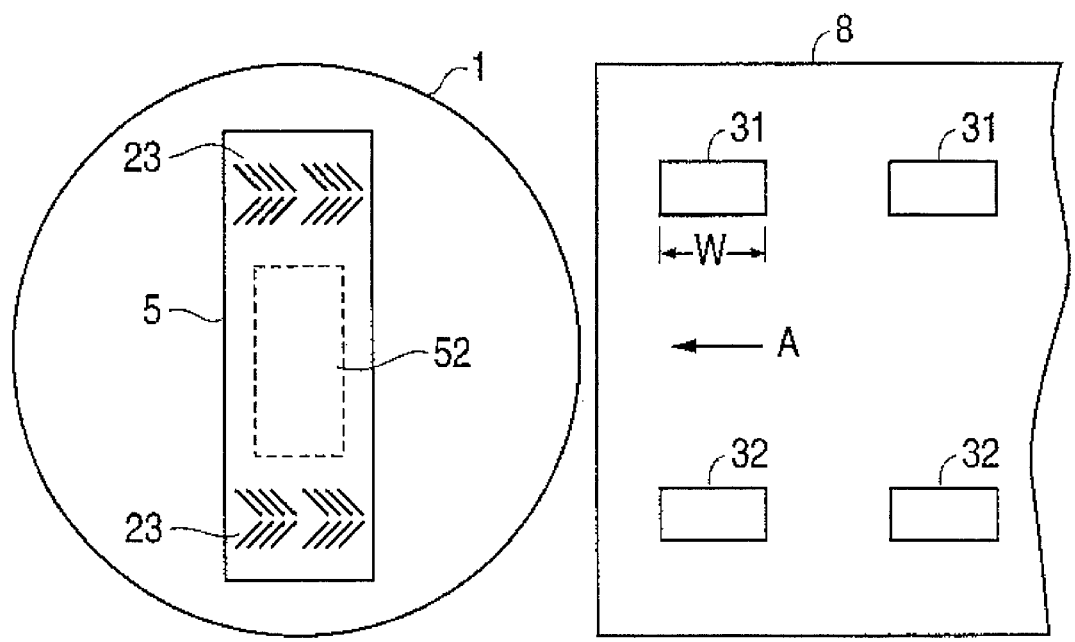

FIGS. 12A and 12B are plan views which illustrate an embodiment for detecting a plurality of objects, each of which is made of a magnetic substance.

Referring to FIG. 12A, a plurality of the magnetoresistance effect elements 21, arranged as shown in FIG. 2A or FIG. 2B for example, are disposed on a straight line passing through the center of the magnetic pole surface 11 of the permanent magnet 1. On the other hand, a plurality of objects 31 and 32, each of which is composed of a printed pattern made of magnetic ink, are formed on a surface of a carrier 8, which is a sheet of paper, for example. During a period in which the carrier 8 is moved in a direction designated by an arrow A, the objects 31 and 32 are individually detected by the corresponding magnetoresistance effect element 21. The objects 31 and 32 to be detected by the corresponding magnetoresistance effect elements 21 are not limited to those disposed on a straight line perpendicular to the direction in which the carrier 8 is moved. The objects 31 and 32 may be a portion of a continuous pattern.

FIG. 12B illustrates an embodiment adaptable to a state where a plurality of the foregoing objects 31 or 32 are, under conditions described with reference to FIG. 5, disposed in the direction in which the carrier 8, which is a sheet of paper, is moved. That is, the width W of the plurality of the objects 31 or 32 in the direction A, in which the carrier 8 is moved, is substantially the same as the dimension of the magnetoresistance effect element 23, while the arrangement pitch of the objects 31 or 32 in the direction, in which the carrier 8 is moved, is about two to five times the width W. In this case, the magnetoresistance effect element 23 comprising the ferromagnetic thin film stripes 46 and 47 having the pattern shown in FIG. 8A or 8B is employed. Also in this embodiment, the objects 31 and 32 may be a portion of the continuous pattern in a direction perpendicular to the direction A, in which the carrier 8 is moved, if the width W and the arrangement pitch of the objects 31 or 32 in the direction A, in which the carrier 8 is moved, satisfy the foregoing conditions.

As shown in FIGS. 12A and 12B, use of, for example, a silicon chip as the substrate 5 enables a semiconductor integrated circuit, for processing the detection signal, to be formed in the central region 52 of the substrate similarly to that shown in FIGS. 9A and 9B. The number of the magnetoresistance effect elements 21 or 23 disposed on the substrate 5 as shown respectively in FIGS. 12A and 12B, of course, is not limited to two. The necessity of forming the objects 31 and 32 on a flat member can be eliminated. For example, they may be formed on the side surface of a cylindrical member which rotates around the axis.

FIG. 13 is a plan view which illustrates an embodiment arranged to detect a plurality of objects, each of which is made of a magnetic substance similarly to the foregoing embodiment of FIGS. 12A and 12B.

A plurality of magnetic sensors, each of which comprises a permanent magnet 1 and a substrate 5, are disposed in line on a supporting member 9, such as a printed circuit board. Each sensor has, as described with reference to FIGS. 12A and 12B, a plurality of magnetoresistance effect elements 21 or 23 (both not shown) disposed on the substrate 5 thereof. Assuming that two magnetoresistance effect elements 21 are disposed on each substrate 5, the structure shown in FIG. 13 having the three sensors is equivalent to a structure in which six magnetoresistance effect elements 21 are disposed on the supporting member 9. A plurality of objects 31 to 36 disposed on a carrier 8, which is a sheet of proper moving in a direction designated by an arrow A, are detected by the corresponding magnetoresistance effect elements 21. Also this embodiment is not limited to the objects 31 to 36 disposed on a straight line perpendicular to the direction in which the carrier 8 is moved. Further, they may be a portion of a continuous pattern in a direction perpendicular to the direction in which the carrier 8 is moved.

As a result of the structure shown in FIG. 13, a plurality of independent patterns, each of which is made of a magnetic substance, or a portion of a continuous pattern can be detected at a high resolution.

FIGS. 14A to 14C illustrate another embodiment of the method of applying the bias magnetic field Hb to a magnetoresistance effect element, the method according to this embodiment being different from the method described with reference to FIG. 1 and arranged in such a manner that the magnetoresistance effect element is disposed at a position deviating from the center of a magnetic pole surface of a permanent magnet.

Referring to a plan view shown in FIGS. 14A and a side view shown in 14B, a plate-like second permanent magnet 12, magnetized to have a magnetic path running parallel to the magnetic pole surface 11 of the cylindrical permanent magnet 1 is disposed on the magnetic pole surface 11. A substrate 5 having a magnetoresistance effect element (omitted from illustration) is stacked on and secured to the permanent magnet 12. As the magnetoresistance effect element, any one of the elements shown in FIGS. 24(A–C), 2(A–B), 3 and 8(A–B) is used, and the employed magnetoresistance effect element is disposed in such a manner that the direction of the illustrated bias magnetic field Hb in FIGS. 2(A–B),3 or 8(A–B) or the longitudinal direction of the ferromagnetic thin film strips 4 in FIG. 24(A–C) runs parallel to the magnetic path of the permanent magnet 12.

The permanent magnet 12 applies the bias magnetic field Hb, running in a predetermined direction to the magnetoresistance effect element, so that the conventional problem, that is, the deterioration in the sensitivity during the repeated operation, can be prevented.

Referring to a plan view shown in FIG. 14C, extruding portions 72, each of which is made of a soft magnetic substance, are disposed respectively at the two end portions of the permanent magnet 12 in the direction of the magnetic path of the same. As an alternative to this, and as shown in the side view of FIG. 14D, a magnetic yoke 7 having, at opposite ends thereof, respective extruding portions 72 may be disposed between the permanent magnet 12 and the substrate 5. As a result, the bias magnetic field Hb can efficiently be applied to the magnetoresistance effect element. Namely, the thickness of the permanent magnet 12 can be reduced, and accordingly an advantage can be realized in that the size and the weight of the magnetic sensor can be reduced. The structure shown in FIG. 14 is able to omit the necessity of locating the magnetoresistance effect element at a position deviating from the center of the magnetic pole surface 11.

Figure 15A:
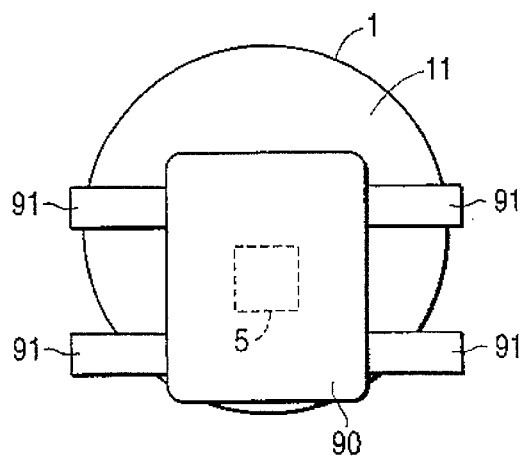
FIGS. 15A–15B are a front view and a side view which illustrate an embodiment of the actual structure of a magnetic sensor according to the present invention.
Figure 15B:
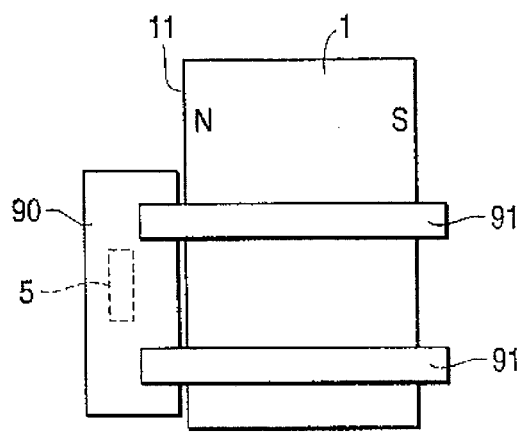

FIGS. 15A and 15B are a plan view and a side view which illustrate the actual structure of the magnetic sensor according to the present invention described with reference to FIG. 1.

The substrate 5, on which a magnetoresistance effect element (not shown) is disposed, is molded in, for example, a block 90 of epoxy resin. The substrate 5 is located at a position deviating from the center of the magnetic pole surface 11, and then the block 90 of resin and the permanent magnet 1 are secured. As the magnetoresistance effect element, any one of the elements shown in FIGS. 24(A–C), 2(A–B), 3 and 8(A–B) is employed. The magnetoresistance effect element is disposed in such a manner that the direction, in which the bias magnetic field Hb must be applied, faces the deviation direction. Reference numeral 91 identifies each one of the respective leads connected to the electrodes 15 to 18 of the bridge circuit comprising the ferromagnetic thin film stripes forming the magnetoresistance effect element.

Figure 16A:
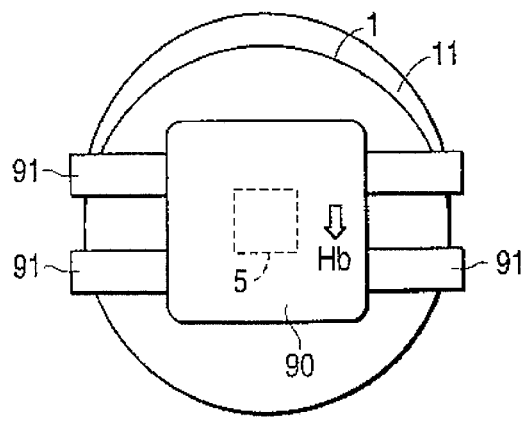
FIGS. 16A–16B are a front view and a side view which illustrate another method of applying a bias magnetic field to a magnetoresistance effect element.
Figure 16B:
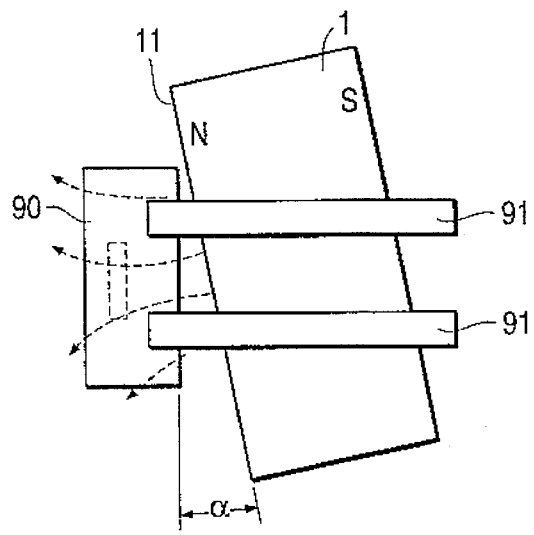

FIGS. 16A and 16B illustrate another embodiment of the method of applying the bias magnetic field Hb to a magnetoresistance effect element, the method according to this embodiment being different from the method described with reference to FIG. 1 in which the magnetoresistance effect element is disposed at a position deviating from the center of the magnetic pole surface 11 of the permanent magnet 1.

In the magnetic sensor described with reference to FIG. 16B for example, the substrate 5 having a magnetoresistance effect element (not shown) is set to be inclined from the magnetic pole surface 11 of the permanent magnet 1 by a predetermined angle $\alpha$, and hence, the block 90 of resin and the permanent magnet 1 are secured. As the magnetoresistance effect element, any one of those shown in FIGS. 24(A–C), 2(A–B), 3 and 8(A–B) is employed, the employed magnetoresistance effect element being disposed in such a manner that the direction, in which the bias magnetic field Hb must be applied, coincides with the direction in which the maximum inclination angle $\alpha$ is made. As a result of the foregoing arrangement, the bias magnetic field Hb can be applied to the ferromagnetic thin film stripes forming the magnetoresistance effect element. Reference numeral 91 represents a lead line similar to that employed in the foregoing embodiment. In the structure shown in FIGS. 16A and 16B, the necessity of locating the magnetoresistance effect element at the position deviating from the center of the magnetic pole surface 11 can be eliminated.

FIG. 17 is a block diagram for explaining the principle structure of a signal conversion circuit according to the present invention. FIGS. 18A to 18D illustrate the waveforms of signals produced in the operation of the conversion circuit. The magnetoresistance effect element 2 (MR) of the magnetic sensor according to the present invention described with reference to, for example, FIG. 1 outputs an analog signal (10 mV P-P) formed as shown in FIG. 18A. A differential amplifier circuit 100 amplifies the foregoing analog signal to, for example, 150 times as shown in FIG. 18B. The amplified signal is rectified by a half wave rectifier circuit 200. The half wave rectifier circuit 200 unidirectionally outputs a unidirectional pulse signal formed as shown in FIG. 18C.

The signal outputs from the differential amplifier circuit 100 and the signal output from the half wave rectifier circuit 200 are subjected to a comparison by a comparator ("CMPR") 300. As a result, a two-state signal formed as shown in FIG. 18D is output from the comparator circuit 300.

Figure 26:
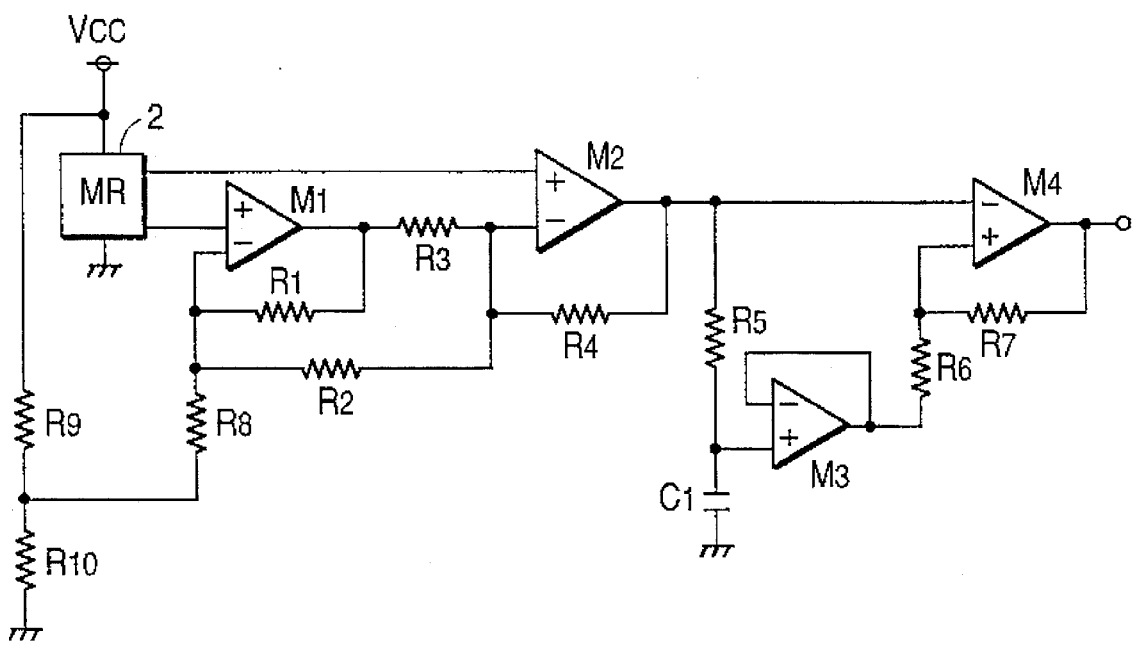
FIG. 26 is a block diagram which illustrates a conventional signal conversion circuit.
Figure 27A:
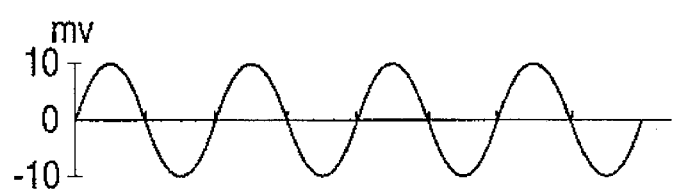
FIGS. 27A–27D illustrate the waveforms of signals shown for explaining the operation of the signal conversion circuit shown in FIG. 26.
Figure 27B:
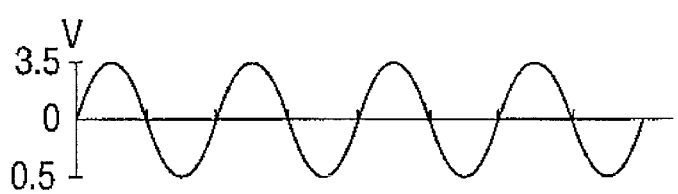
Figure 27C:
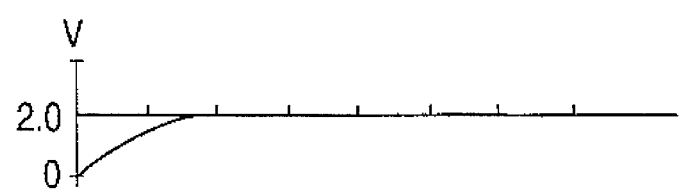
Figure 27D:
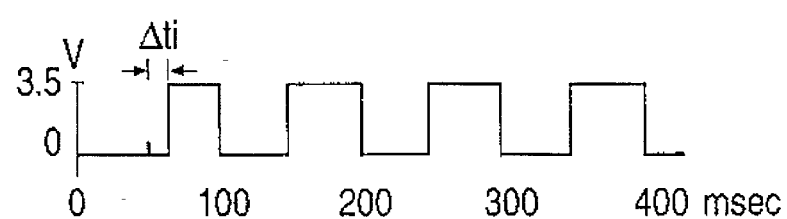

The conversion circuit shown in FIG. 17 has no integrating circuit having a large time constant as in the conventional conversion circuit shown in FIG. 26. Further, it does not need the capacitor Cl having a large capacity employed in the foregoing integrating circuit. Therefore, the present invention is able to overcome the problem of the undesirable change in the width of the two-state signal pulse, experienced with the structure which uses the conventional conversion circuit.

Figure 19:
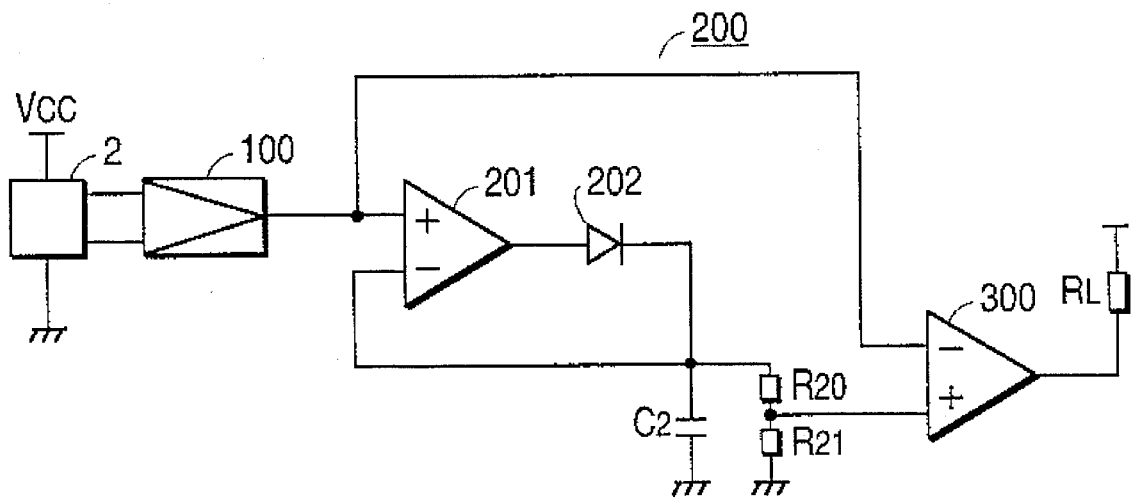
FIG. 19 is a block diagram which illustrates an embodiment of the signal conversion circuit according to the present invention.

FIG. 19 is a block diagram which illustrates an embodiment of a signal conversion circuit shown in FIG. 17 and according to the present invention.

The half wave rectifier circuit 200 comprises, for example, an operational amplifier 201 and a diode 202. A non-inverting input of the operational amplifier 201 is connected to the output of the foregoing differential amplifier circuit 100. The diode 202 is, in the forward direction, connected between the output of the operational amplifier 201 and the inverting input terminal of the same. As a result of the foregoing structure, the temperature characteristics of the diode 202 can be compensated.

The capacitor C2 connected between the output of the diode 202 and the ground is provided for the purpose of holding the output voltage, the capacitor C2 having a capacity of from about several to ten pF. Therefore, the operation speed of the half wave rectifier circuit 200 cannot substantially be affected.

The unidirectional pulse signal output from the half wave rectifier circuit 200 is divided by a dividing resistor, composed of resistors R20 and R21, and received by the non-inverting input terminal of the comparator 300. The unidirectional pulse signal is subjected to a comparison with the signal transmitted from the differential amplifier circuit 100 to the inverting input terminal of the comparator circuit 300. If the level of the unidirectional pulse signal is closer to that of the output signal from the differential amplifier circuit 100, there is a possibility that an erroneous two-state signal pulse is generated. Therefore, the unidirectional pulse signal to be received by the comparator circuit 300 is divided to, for example, one-tenth by the dividing resistor.

Figure 20:
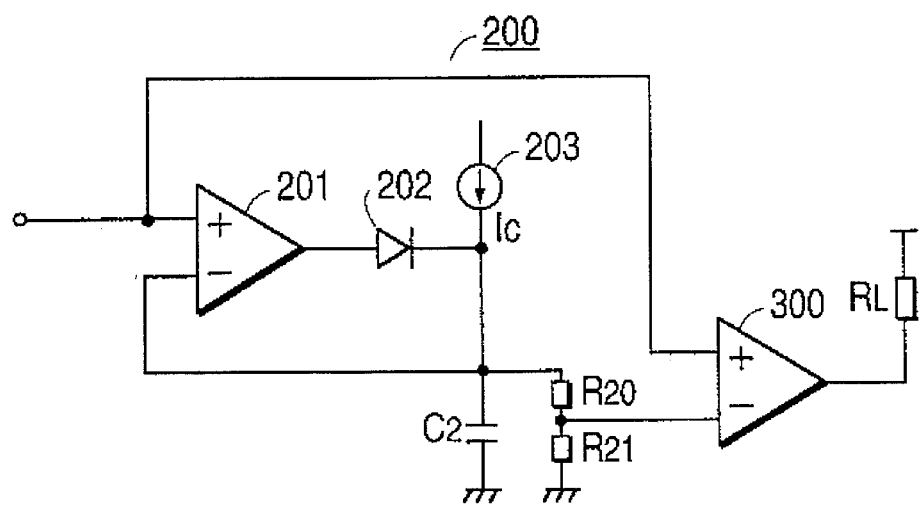
FIG. 20 is a block diagram which illustrates another embodiment of a half wave rectifier circuit of the signal conversion circuit according to the present invention.

FIG. 20 is a block diagram which illustrates another embodiment of the half wave rectifier circuit 200, wherein a constant current supply 203 is connected to the output of the diode 202. Therefore, an additional current Ic is supplied to the foregoing dividing resistor composed of the resistors R20 and R21. As a result, the DC level of the unidirectional pulse current to be supplied to the comparator 300 is raised by Ic×R21. It leads to a result that the width of the two-state signal pulse output from the comparator 300 is widened. The foregoing method enables the duty ratio to be made larger than 1:1.

Figure 21:
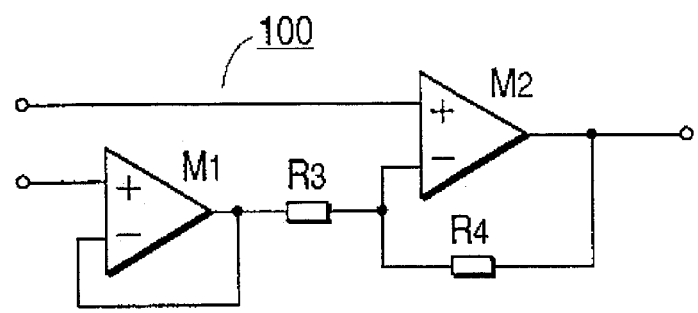
FIG. 21 is a block diagram which illustrates an embodiment of a differential amplifying circuit of the signal conversion circuit according to the present invention.
Figure 22A:
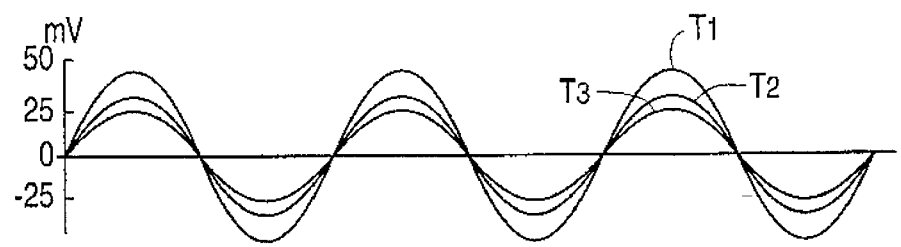
FIGS. 22A–22D illustrate the total temperature characteristics realized by combining the magnetic sensor and the signal conversion circuit according to the present invention with each other.
Figure 22B:
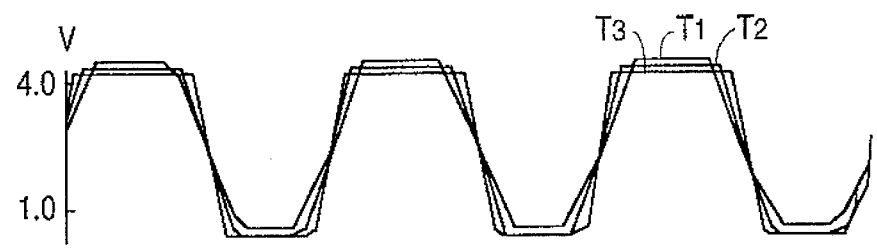
Figure 22C:
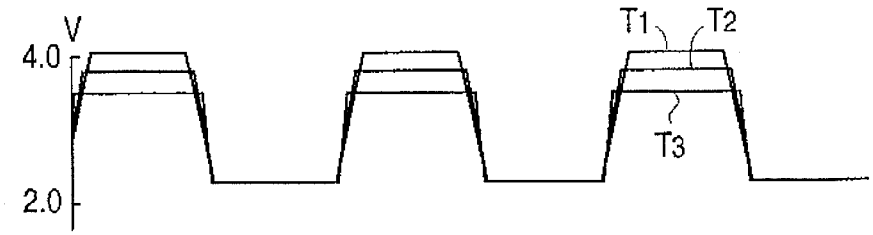
Figure 22D:
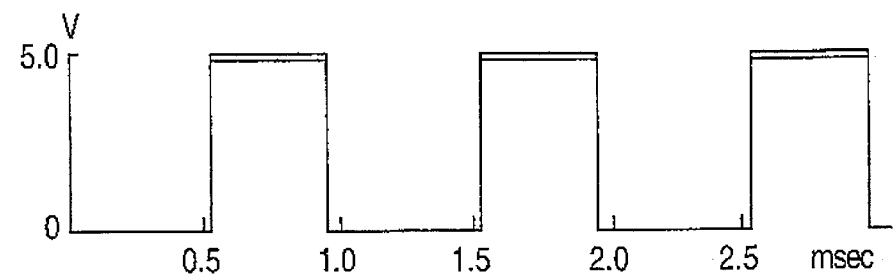
Figure 23A:
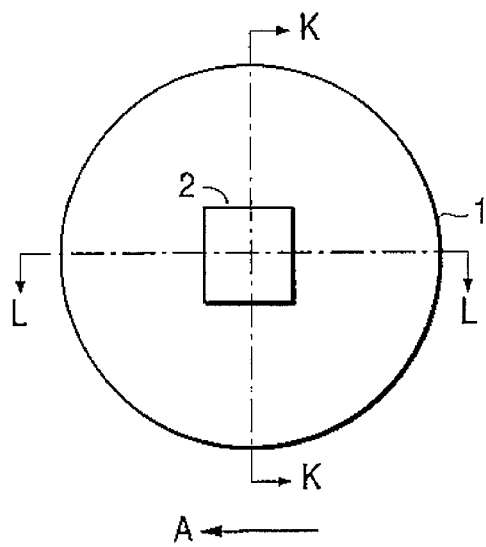
FIGS. 23A–23D illustrate a conventional technology relating to the magnetic sensor according to the present invention.
Figure 23B:
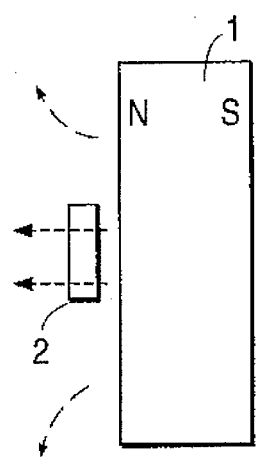
Figure 23C:
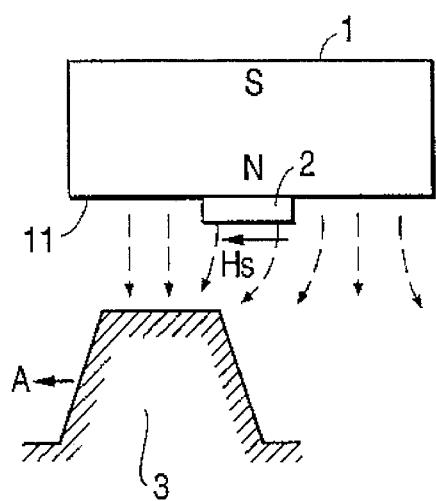
Figure 23D:
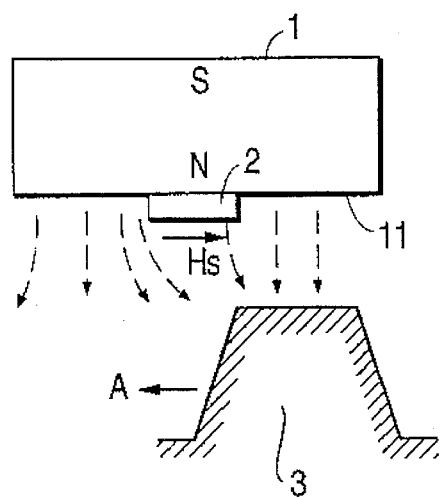

FIG. 21 is a block diagram which illustrates the structure of the differential amplifier circuit 100.

In the conventional signal conversion circuit shown in FIG. 26, power supply voltage Vcc divided by the resistors R9 and R10 is supplied to the operational amplifiers M1 and M2 through the resistor R8. The divided voltage is the DC level of the differential amplifier circuit, that is, the operation point. On the other hand, in the half wave rectifier circuit 200 shown in FIG. 19 or FIG. 20, the DC level of the output signal is the middle point of the dynamic range of the output signal or the potential determined by Ic×R21. Therefore, a circuit corresponding to the resistors R8 and R2 shown in FIG. 26 must be omitted as shown in FIG. 21. In order to set a high input impedance, the output terminal and the inverting input terminal of the operational amplifier M1 must be directly connected to each other.

FIG. 22 is a graph which illustrates the temperature characteristics of the operation of the apparatus formed by combining the foregoing magnetic sensor and the signal conversion circuit according to the present invention. FIG. 22A is a graph which illustrates the waveform of the output signal from the magnetic sensor, FIG. 22B is a graph which illustrates the waveform of the output signal from the differential amplifier circuit 100, FIG. 22C is a graph which illustrates the waveform of the unidirectional pulse signal transmitted from the half wave rectifier circuit 200, and FIG. 22D is a graph which illustrates the waveform of the two-state pulse transmitted from the comparator 300. In the foregoing figures, the parameter is the temperature (T), arranged such that T1 is −50° C., T2 is 25° C. and T3 is 100° C. As can be understood from the figures, the waveform of the two-state signal pulse is substantially not affected in the temperature range. As shown in FIG. 22(A–D), the DC level of the pulsating current signal is shifted by an amount corresponding to the product of the electric current Ic from the constant current supply 203 and the resistor R21.

According to the present invention, the initial magnetization of a plurality of ferromagnetic thin film stripes forming a magnetoresistance effect element is arranged to face a predetermined direction. Therefore, the detection sensitivity of the magnetic sensor comprising the magnetoresistance effect element can be stabilized. Further, the width of the two-state signal, corresponding to the analog output signal transmitted from the magnetic sensor, can be maintained at a predetermined value. As a result, the accuracy of the control to be performed with the magnetic sensor can be improved. The present invention enables the circuit, for converting the analog output signal into the two-state signal, to be integrated with the magnetoresistance effect element. It leads to a result that the size of the apparatus comprising the magnetic sensor can be reduced. Furthermore, the present invention, arranged in such a manner that a plurality of the magnetoresistance effect elements are integrated, enables the magnetic pattern formed on the surface of a sheet of paper to be detected.

We claim:

1. A magnetic sensor, comprising:

a magnet having a magnetic pole surface, said surface having a center and facing an object to be detected;

a magnetoresistance effect element comprising a plurality of stripes, each stripe comprising a ferromagnetic thin film which is parallel to, and spaced apart from, said magnet surface and extends in a first direction, said plurality of said ferromagnetic thin film stripes being arranged in four groups, each group comprising a respective plurality of said ferromagnetic thin film stripes extending in the first direction and connected in series at corresponding terminals through respective ends thereof and said four groups being connected through said corresponding terminals so as to form a bridge circuit;

a plurality of second stripes disposed on each of said ferromagnetic thin film stripes, each of said second stripes comprising a conductor thin film and extending in a direction at an angle of approximately 45° relatively to the first direction in which said ferromagnetic thin film stripes extend; and said magnetoresistance effect element being disposed so as to deviate from the center of said magnet surface in the first direction, the first direction being perpendicular to a second direction in which said object moves relatively to the magnetic pole surface of the magnet.

2. A magnetic sensor as set forth in claim 1, wherein respective said second stripes, in any two of said groups which are adjacent to each other in said bridge circuit, extend perpendicularly to each other.

3. A magnetic sensor as set forth in claim 1, wherein:

respective said second stripes, in any two of said groups adjacent to each other in a direction perpendicular to the first direction, extend in parallel with respect to each other; and respective said second stripes, in any two of said groups adjacent to each other in a direction parallel to the first direction, extend perpendicularly to each other.

4. A magnetic sensor as set forth in claim 1, wherein respective said ferromagnetic thin film stripes of two of said groups, which are deviated farther from the center of said magnet surface than the other two of said groups, have a width which is greater than the width of the respective said ferromagnetic thin film stripes of said other two groups.

5. A magnetic sensor as set forth in claim 1, wherein respective said ferromagnetic thin film stripes of two said groups, which are deviated farther from the center of said magnet surface than the other two of said groups, have a thickness which is smaller than the thickness of the ferromagnetic thin film stripes of said other two groups.

6. A magnetic sensor as set forth in claim 1, wherein a plurality of said magnetoresistance effect elements is disposed at a plurality of positions on said magnet surface, one each in the first direction.

7. A magnetic sensor as set forth in claim 6, wherein a region, for a semiconductor integrated circuit for processing signals output from each of said magnetoresistance effect elements, is defined at the center of said magnet surface.

8. A magnetic sensor as set forth in claim 7, further comprising a silicon substrate covered with an insulating layer and disposed on said magnet surface, wherein said magnetoresistance effect element is formed on said insulating layer and said semiconductor integrated circuit is formed in a region of said silicon substrate, said region corresponding to the center of said magnet surface.

9. A magnetic sensor as set forth in claim 6, wherein said object comprises a pattern formed on a surface of a carrier member undergoing linear motion or a rotary motion, the surface of said carrier member having a portion facing said magnet surface, and said object being moved by the motion of said carrier member.

10. A magnetic sensor as set forth in claim 1, wherein:
every two adjacent groups, as connected in the bridge circuit, are connected at a common, respective said terminal and the corresponding, said serially connected stripes of each group are connected at opposite ends thereof to respective said common terminals.

11. A magnetic sensor as set forth in claim 10, wherein:
the four groups comprise first, second, third and fourth groups respectively comprising first, second, third and fourth pluralities of corresponding first, second, third and fourth ferromagnetic thin film stripes; and
said first plurality is spaced from said second plurality in said second direction, said third plurality is spaced from said fourth plurality in said second direction, said first plurality is spaced from said third plurality in said first direction with the corresponding first and third ferromagnetic thin film stripes thereof in aligned relationship and said second plurality is spaced from said fourth plurality in said first direction with said corresponding second and fourth ferromagnetic thin film stripes thereof in aligned relationship.

12. A magnetic sensor as set forth in claim 10, wherein:
the four groups comprise first, second, third and fourth groups respectively comprising first, second, third and fourth pluralities of corresponding first, second, third and fourth ferromagnetic thin film stripes; and
said corresponding first and second ferromagnetic thin film stripes of said first and second pluralities thereof are disposed in interdigitized relationship with each first ferromagnetic thin film stripe adjacent to a corresponding second ferromagnetic thin film stripe and spaced therefrom in the second direction;
said corresponding third and fourth ferromagnetic thin film stripes of said third and fourth pluralities thereof are disposed in interdigitized relationship with each third ferromagnetic thin film stripe adjacent to a corresponding fourth ferromagnetic thin film stripe and spaced therefrom in the second direction; and
corresponding first and third thin film stripes of said first and third pluralities thereof are aligned in the first direction and corresponding second and fourth thin film stripes of said second and fourth pluralities thereof are aligned in the first direction.

13. A magnetic sensor for detecting an object made of a soft magnetic material, comprising:
a magnet having a magnetic pole surface, said surface having a center and facing an object;
a magnetoresistance effect element including four groups, each group comprising a plurality of ferromagnetic thin film stripes extending in a first direction, perpendicular to a second direction of movement of the object and in parallel with respect to said magnet surface with a space therebetween and, further, extending in parallel, spaced relationship with respect to the ferromagnetic thin film stripes of each other group, said plurality of stripes in each group being connected in series through respective ends thereof and said four groups being connected so as to form a bridge circuit through terminals of respective serially connected said stripes thereof, said four groups being respectively disposed at four positions which deviate from the center of said magnet surface along said magnet surface symmetrically with respect to the center of said magnet surface; and
a plurality of second stripes, each second stripe being made of a conductor thin film and formed on a respective one of said ferromagnetic thin film stripes, said second stripes extending in a direction at an angle of approximately 45° with respect to the first direction in which said respective ferromagnetic thin film stripes extend.

14. A magnetic sensor as set forth in claim 13, wherein two pairs, each pair comprising two said groups adjacent to each other in said bridge circuit, are respectively disposed on two straight lines perpendicular to the direction in which said object moves.

15. A magnetic sensor as set forth in claim 13, wherein a region, for a semiconductor integrated circuit for processing signals output from said magnetoresistance effect element, is defined at the center of said magnet surface.

16. A magnetic sensor as set forth in claim 15, further comprising a silicon substrate covered with an insulating layer and disposed on said magnet surface, wherein said magnetoresistance effect element is formed on said insulating layer and said semiconductor integrated circuit is formed in a region of said silicon substrate, said region corresponding to the center of said magnet surface.

* * * * *

UNITED STATES PATENT AND TRADEMARK OFFICE
CERTIFICATE OF CORRECTION

PATENT NO. : 5,585,719
DATED : Dec. 17, 1996
INVENTOR(S) : ENDO et al.

It is certified that error appears in the above-indentified patent and that said Letters Patent is hereby corrected as shown below:

TITLE PAGE: [56] References Cited, under "U.S. PATENT DOCUMENTS" insert the following:

-- 5,055,781   10/1991   Sakakibara et al. ........... 324/207.25 X --

Col. 4,   line 14, change "FIG." to --FIGS.--.

Col. 7,   line 59, change "is a" to --are--; and change "illustrates" to --illustrate--.

Col. 9,   line 34, change "1C and 1C" to --1C and 1D--.

Col. 11,  line 53, change "FIGS. 6A" to --FIG. 6A--.

Col. 12,  line 21, change "disposed or" to --disposed on--;
          line 49, change "he" to --the--.

Col. 13,  lines 39-40, delete "FIG. Supporting the magnetoresistance effect element 23.".

Col. 14,  line 54, change "proper" to --paper--.

Col. 15,  line 20, change "FIG." to --FIGS.--.

Col. 17,  line 62, change "FIG." to --FIGS.--.

Signed and Sealed this

Eighth Day of July, 1997

*Attest:*

BRUCE LEHMAN

*Attesting Officer*        *Commissioner of Patents and Trademarks*